US012675955B2

(12) United States Patent
Edwards

(10) Patent No.: US 12,675,955 B2
(45) Date of Patent: Jul. 7, 2026

(54) SYSTEM AND METHOD FOR SHARED FRAME-OF-REFERENCE CONTENT STREAMING

(71) Applicant: Adeia Guides Inc., San Jose, CA (US)

(72) Inventor: Warren Keith Edwards, Atlanta, GA (US)

(73) Assignee: Adeia Guides Inc., San Jose, CA (US)

( * ) Notice: Subject to any disclaimer, the term of this patent is extended or adjusted under 35 U.S.C. 154(b) by 94 days.

(21) Appl. No.: 18/104,191

(22) Filed: Jan. 31, 2023

(65) Prior Publication Data

US 2024/0257472 A1 Aug. 1, 2024

(51) Int. Cl.
| | |
|---|---|
| *G06T 19/00* | (2011.01) |
| *G02B 27/01* | (2006.01) |
| *G06T 19/20* | (2011.01) |
| *G06V 10/74* | (2022.01) |

(52) U.S. Cl.
CPC ........ *G06T 19/006* (2013.01); *G02B 27/0172* (2013.01); *G06T 19/20* (2013.01); *G06V 10/761* (2022.01); *G02B 2027/0178* (2013.01); *G06T 2219/2004* (2013.01); *G06V 2201/07* (2022.01)

(58) Field of Classification Search
CPC .................. G06T 19/006; G06T 19/20; G06T 2219/2004; G02B 27/0172; G02B 2027/0178; G06V 10/761; G06V 2201/07
See application file for complete search history.

(56) References Cited

U.S. PATENT DOCUMENTS

| | | | | |
|---|---|---|---|---|
| 7,139,767 B1 * | 11/2006 | Taylor | .................... | G06F 16/78 |
| | | | | 707/999.102 |
| 7,346,654 B1 * | 3/2008 | Weiss | ....................... | H04N 7/15 |
| | | | | 348/E7.083 |
| 8,072,479 B2 * | 12/2011 | Valliath | .................. | H04N 7/147 |
| | | | | 715/762 |
| 8,279,254 B2 * | 10/2012 | Goose | ...................... | G09G 5/14 |
| | | | | 455/556.1 |
| 8,576,276 B2 | 11/2013 | Bar-Zeev et al. | | |

(Continued)

FOREIGN PATENT DOCUMENTS

EP          3054690 A1      8/2016

OTHER PUBLICATIONS

U.S. Appl. No. 17/394,831, filed Aug. 5, 2021, Vikram Makam Gupta.

(Continued)

*Primary Examiner* — Motilewa Good-Johnson
(74) *Attorney, Agent, or Firm* — HG LAW LLP

(57) ABSTRACT

Systems and methods for creating a social content-viewing experience are described herein. In one embodiment, users are located in different physical locations. Each user is viewing a screen in a respective physical location. Content displayed on the screens is synchronized by a media system such that each user is viewing the same media asset. A media asset may be a movie, TV show, sports game, photo, presentation, or video game, to name a few examples. At least one user is using an AR headset. The AR headset displays avatars to represent the other users and displays the avatars in the viewing area of the user wearing the AR headset. For the user wearing the AR headset, the avatars provide a viewing experience that simulates having the other users present in the viewing area.

20 Claims, 14 Drawing Sheets

(56) References Cited

U.S. PATENT DOCUMENTS

| | | | | |
|---|---|---|---|---|
| 8,675,067 | B2 * | 3/2014 | Chou | H04N 7/147 |
| | | | | 348/149 |
| 9,288,242 | B2 * | 3/2016 | Van Wie | H04L 12/1813 |
| 9,317,113 | B1 | 4/2016 | Karakotsios et al. | |
| 9,658,994 | B2 | 5/2017 | Sipe et al. | |
| 9,723,293 | B1 | 8/2017 | Cederlof | |
| 9,908,046 | B2 * | 3/2018 | Dawson | A63F 13/88 |
| 10,609,334 | B2 * | 3/2020 | Li | G06V 40/161 |
| 10,719,988 | B2 * | 7/2020 | Sivanadian | G06F 3/011 |
| 11,093,103 | B2 * | 8/2021 | Agarawala | G06T 19/20 |
| 11,113,897 | B2 | 9/2021 | Gupta et al. | |
| 11,233,973 | B1 * | 1/2022 | Ishimoto | H04L 41/0895 |
| 11,399,166 | B2 * | 7/2022 | Hailpern | H04N 9/3194 |
| 11,700,354 | B1 * | 7/2023 | Krol | G06F 3/04815 |
| | | | | 348/14.08 |
| 11,776,227 | B1 * | 10/2023 | Krol | G06T 5/70 |
| | | | | 345/419 |
| 11,947,871 | B1 * | 4/2024 | Fisher-Stawinski | H04S 7/303 |
| 12,028,651 | B1 * | 7/2024 | Braund | H04N 7/157 |
| 12,056,835 | B2 | 8/2024 | Gupta et al. | |
| 2005/0168402 | A1 * | 8/2005 | Culbertson | G06T 19/20 |
| | | | | 345/8 |
| 2005/0251827 | A1 | 11/2005 | Ellis et al. | |
| 2011/0225498 | A1 * | 9/2011 | Goldman | G06Q 50/01 |
| | | | | 715/757 |
| 2012/0264510 | A1 | 10/2012 | Wigdor et al. | |
| 2012/0274736 | A1 * | 11/2012 | Robinson | H04N 7/15 |
| | | | | 348/E7.083 |
| 2012/0281059 | A1 * | 11/2012 | Chou | H04L 12/1827 |
| | | | | 348/E7.083 |
| 2013/0024785 | A1 * | 1/2013 | Van Wie | G06F 3/0484 |
| | | | | 715/753 |
| 2013/0222393 | A1 | 8/2013 | Merrell et al. | |
| 2014/0036061 | A1 * | 2/2014 | Cohen | D03J 1/007 |
| | | | | 348/92 |
| 2014/0317659 | A1 | 10/2014 | Yasutake | |
| 2015/0102981 | A1 | 4/2015 | Lee et al. | |
| 2016/0350973 | A1 * | 12/2016 | Shapira | G06F 3/011 |
| 2017/0103576 | A1 | 4/2017 | Defaria et al. | |
| 2017/0105052 | A1 * | 4/2017 | DeFaria | H04N 21/4334 |
| 2017/0201722 | A1 * | 7/2017 | Wilson | H04N 7/147 |
| 2019/0130655 | A1 * | 5/2019 | Gupta | H04N 21/4722 |
| 2019/0310761 | A1 * | 10/2019 | Agarawala | G06F 3/04817 |
| 2019/0313059 | A1 * | 10/2019 | Agarawala | G06F 3/011 |
| 2019/0340820 | A1 * | 11/2019 | Sivanadian | H04N 21/23106 |
| 2020/0074751 | A1 | 3/2020 | Gupta et al. | |
| 2020/0169586 | A1 * | 5/2020 | Wang | G06F 3/011 |
| 2021/0165557 | A1 * | 6/2021 | Agarawala | G06F 3/167 |
| 2021/0256769 | A1 * | 8/2021 | Bailey | G06F 3/011 |
| 2021/0368136 | A1 * | 11/2021 | Chalmers | G06T 19/006 |
| 2021/0375066 | A1 | 12/2021 | Gupta et al. | |
| 2022/0030197 | A1 * | 1/2022 | Ishimoto | G06T 13/40 |
| 2022/0070235 | A1 * | 3/2022 | Yerli | G06F 3/011 |
| 2022/0277528 | A1 * | 9/2022 | Funazukuri | G06F 3/167 |
| 2023/0086906 | A1 * | 3/2023 | Tang | G06F 3/04842 |
| | | | | 715/753 |
| 2023/0273706 | A1 * | 8/2023 | Smith | G06F 3/04815 |
| | | | | 345/419 |
| 2024/0214525 | A1 * | 6/2024 | Ma | H04N 7/157 |
| 2024/0257472 | A1 * | 8/2024 | Edwards | G06T 19/006 |

OTHER PUBLICATIONS

International Search Report and Written Opinion for PCT Application No. PCT/US 2018/057569, dated Dec. 19, 2018, 16 pages.
IseeAR | Interactive Augmented Reality for Video Conference | AR&Co, YouTube, uploaded by AR&Co, Feb. 1, 2021, https://www.youtube.com/watch?v=wpHXLmwNZQk.
Jones et al., "IllumiRoom: Peripheral Projected Illusions for Interactive Experiences," Session: Interacting Around Devices, CHI 2013: Changing Perspectives, Paris, France (10 Pages).
Vogue Living, YouTube video on Ikea: "Ikea's new augmented reality app will change the way you decorate", Aug. 29, 2017. https://www.youtube.com/watch?v=cdv0b0BqPk (Year: 2017).
YouTube Video on AR Dragon: New Augmented Reality Pet Simulator, Sep. 20, 2017, https://youtube.com/watch?v=6xk163uQgu (2017).
"Banuba—AR Conferencing & Live Streaming", retrieved at https://www.banuba.com/solutions/ar-conferencing-and-live-streaming on Apr. 18, 2023.
"Imaginate Collaborate in VR/AR", retrieved at https://www.imaginate.in/ on Apr. 19, 2023.
"Zugara Streaming Augmented Reality Engine (ZugSTAR)", retrieved at http://zugara.com/augmented-reality-and-virtual-reality-technology/augmented reality-video-conferencing on Apr. 18, 2023.
Gualda, Andre , "Virtual reality: a vision of the future of social TV", Ericsson.com, retrieved at https://www.ericsson.com/en/blog/2017/10/virtual-reality-a-vision-of-the-future-of-social-tv, Oct. 18, 2017.
Melnick, Kyle , "How to Watch TV & Movies With Friends On Oculus Quest 2", VR Scout, retrieved at https://vrscout.com/news/watch-tv-movies-with-friends-oculus-quest-2/, Dec. 12, 2020.
Munson, Ben , "DirecTV Now streaming app launches on Magic Leap augmented reality glasses", Fierce Video, retrieved at https://www.fiercevideo.com/video/directv-now-launches-magic-leap-ar-glasses, May 16, 2019.
Rothe, S. , et al., "Social Viewing in Cinematic Virtual Reality: A Design Space for Social Movie Applications", Virtual Reality, 25, 613-630, 2021.
Rubin, Ross , "Augmented reality invades the conference room", ZDNet, retrieved at https://www.zdnet.com/article/augmented-reality-invades-the-conference-room/, Nov. 8, 2018.
Spangler, Todd , "Why AT&T Launched a DirecTV Streaming App on Magic Leap's Mixed-Reality Headset (Exclusive)", Variety, retrieved at https://variety.com/2019/digital/news/att-directv-now-magic-leap-headset-1203213495/, May 14, 2019.

* cited by examiner

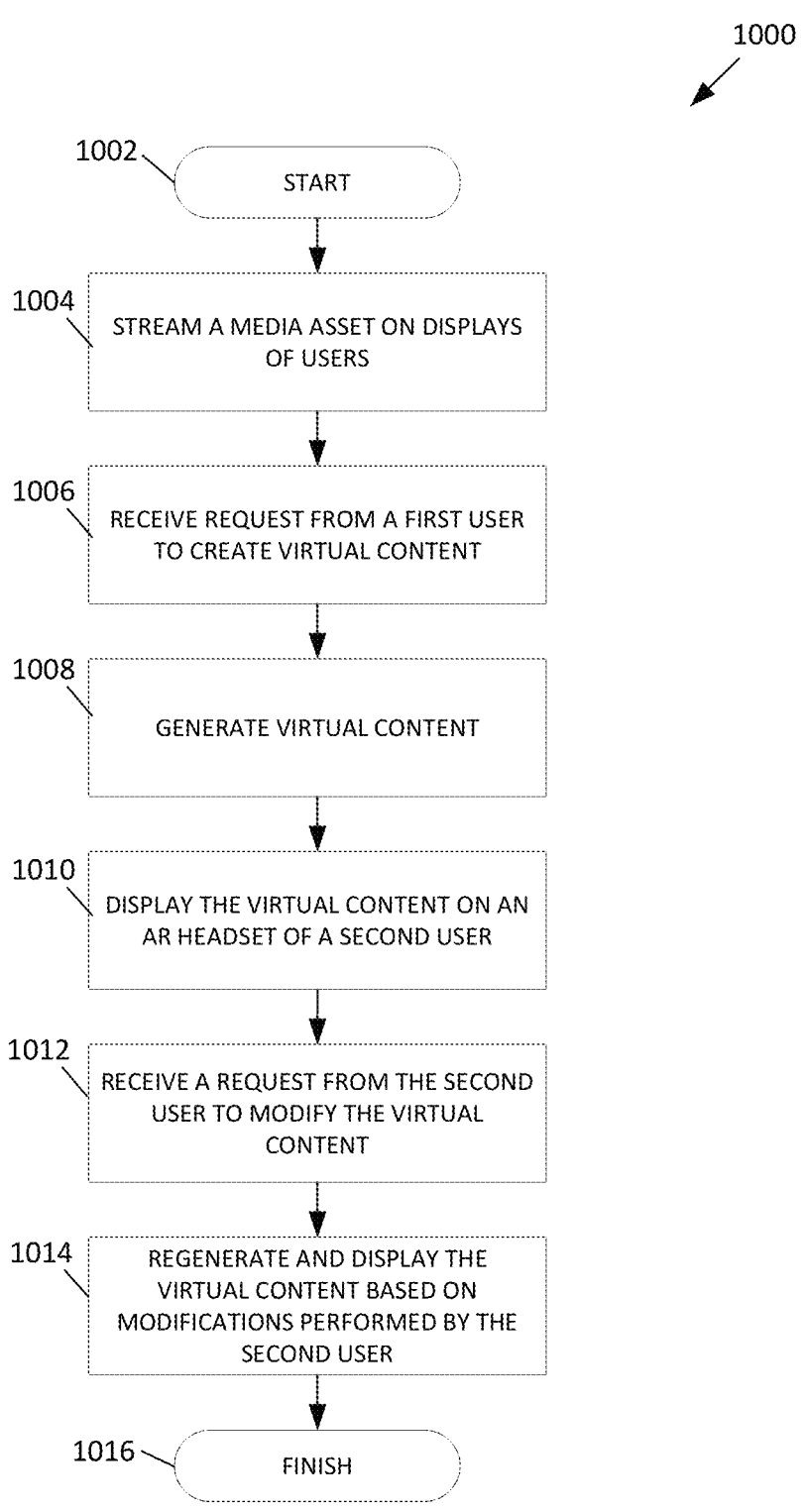

1000

1002 — START

1004 — STREAM A MEDIA ASSET ON DISPLAYS OF USERS

1006 — RECEIVE REQUEST FROM A FIRST USER TO CREATE VIRTUAL CONTENT

1008 — GENERATE VIRTUAL CONTENT

1010 — DISPLAY THE VIRTUAL CONTENT ON AN AR HEADSET OF A SECOND USER

1012 — RECEIVE A REQUEST FROM THE SECOND USER TO MODIFY THE VIRTUAL CONTENT

1014 — REGENERATE AND DISPLAY THE VIRTUAL CONTENT BASED ON MODIFICATIONS PERFORMED BY THE SECOND USER

1016 — FINISH

DETERMINE A POSITION OF A FIRST USER IN RELATION
TO A FIRST SCREEN

1104

IDENTIFY A POSITION FOR AN AVATAR OF THE FIRST
USER IN RELATION TO A SECOND SCREEN OF A SECOND
USER

1106

GENERATE FOR DISPLAY ON AN AUGMENTED REALITY
(AR) DEVICE OF THE SECOND USER, THE AVATAR OF THE
FIRST USER IN THE IDENTIFIED POSITION

1120

1122

DETERMINE AN ANGLE AND A DISTANCE OF A FIRST
USER FROM A FIRST SCREEN

1124

IDENTIFY A POSITION FOR AN AVATAR OF THE FIRST
USER IN RELATION TO THE SECOND SCREEN BASED ON
THE ANGLE AND THE DISTANCE OF THE FIRST USER
FROM THE FIRST SCREEN

1126

GENERATE FOR DISPLAY ON AN AUGMENTED REALITY
(AR) DEVICE OF THE SECOND USER, THE AVATAR OF THE
FIRST USER IN THE IDENTIFIED POSITION

SYSTEM AND METHOD FOR SHARED FRAME-OF-REFERENCE CONTENT STREAMING

BACKGROUND

This disclosure is directed to systems and methods for streaming content between users in different physical locations using virtual representations of the users.

SUMMARY

Viewing content, such as video content, is a social experience that may be shared by several people. For example, people may gather to watch a show or movie or to participate in a presentation. The social experience includes discussing the content. When watching a movie, the viewers may comment on scenes or actors in the movie. When viewing a presentation, participants may ask questions about what is presented. Body language, such as posture, gestures, eye contact, and facial expressions, are also part of the social experience. As remote jobs increase and people move to new locations, there are fewer opportunities to view content in a single location as viewers may be located in different locations. Thus, a means of viewing content that better replicates the social experience of users viewing the content together in one room is needed.

In one approach, content may be viewed by people or users in multiple locations. Playback of the content may be synchronized so each user is viewing the same content. For example, if one user pauses a movie, the movie may pause for the other users. While this approach allows for a shared viewing experience, it does not provide social interaction for the users.

In another approach, a chat feature may be available to all users viewing synchronized content. The chat may be text, voice, or video based. While the chat allows users to comment on the content, the body language of each user may not be conveyed. For example, a user may become fidgety indicating they want to comment on the content, but the chat feature may not allow the other users to recognize the fidgety user wishes to speak. Further, certain social cues may not be captured by the chat. For example, it may be difficult for a user to discern when another user is done speaking, and as a result, the discussion may feel unnatural. In some approaches using video chat, all users may not be displayed. For example, the user speaking may be the only user displayed, or their video may be larger than the other users. Since the non-speaking users may not be visible, the video chat may not provide an adequate social content viewing experience.

In another approach, a single user may view spatially-arranged videos of other users viewing the content. For example, videos of the other users may be arranged in a thumbnail or grid-like view. This allows the user to view all of the other users. However, this may require separate screens for viewing the content and viewing the users. Since the videos of the other users are arranged in close proximity to one another, the other users may have a hard time discerning whom the speaking user is speaking to. Further, the attention of the users may be split since the users must choose whether to pay attention to the content or to the spatially-arranged videos of the other users.

In another example, the videos of the other users may be placed in chairs, such as in an auditorium or around a table, to simulate being in one room. While this arrangement may feel more natural, it presents the same challenges as the thumbnail video arrangement.

In another approach, users may view content using virtual reality (VR) headsets. The VR headsets may present a shared virtual world to the users, and the content may be presented on a virtual screen in the virtual world. Avatars may be used to provide a virtual representation of the users in the virtual world, and each avatar may move around in the virtual world. However, the content may only be viewed in the virtual world, which may present challenges. The virtual screen may not have the same "feel" as an actual screen, such as a television or monitor. Users may have already invested in high-quality screens that they wish to use or stylized rooms and furniture that they wish to see. VR headsets may cause some users to feel sick or nauseous after extended use. Further, coordinating the positions of the avatars and the virtual screen is not trivial, since each user may exist in a separate physical space that is arranged differently than the virtual world. Thus, viewing content using VR headsets may not provide an enjoyable experience for all users.

Accordingly, there is a need to provide a content viewing experience between users in different locations that captures the social experience of being together. Such a solution leverages the ability to synchronize playback of content with the mixed reality of augmented reality (AR).

To solve these problems, systems and methods are provided herein for providing virtual representations of other users in a real-world environment, where a position of each user in relation to a screen is used to place the virtual representation to the user.

In one approach, users are located in different physical locations. Each user is streaming or viewing a media asset on a respective screen in a respective physical location. Content displayed on the screens is synchronized by a media system such that each user is viewing the same media asset. A media asset may be a movie, TV show, sports game, photo, presentation, three-dimensional (3D) content, or video game, to name a few examples. At least one user is using an AR headset. The AR headset displays avatars to represent the other users (e.g., remote users) and displays the avatars in the viewing area of the user wearing the AR headset. For the user wearing the AR headset, the avatars provide a viewing experience that simulates having the remote users present in the viewing area.

Avatars are displayed in positions corresponding to the positions of the remote users. For example, the position of each remote user in relation to their respective screen on which the media asset is streamed is determined. The positions may be determined by at least one of the media system and the AR headset. The position may include a distance and an angle from the respective screen. The distance and angle may be taken from any point on the screen, such as a left or right edge, or a center point, and to a point of the users. A position sensor or the AR headset may determine the distance and/or the angle. In some embodiments, the distance and angle are taken in 3D space. In some embodiments, the distance and angle are taken in two-dimensional (2D) space using a single plane, such as an overhead view of the physical location. In some embodiments, the positions of the remote users may be determined in relation to a different object or reference. For example, the positions may be determined in relation to the a point on media system, a point at a portion of the room (e.g., a wall, corner, door, or opening), or the position sensor, to name a few examples.

In another approach, the media system tracks the position of the users as they move about the respective physical location. The AR headset updates the position of the avatars accordingly. For example, if a user moves towards their screen to point at something on the screen, the user wearing the AR headset will see the respective avatar pointing to the screen. This allows a more realistic media viewing experience. In some embodiments, AR headsets may track the position of the users.

In some embodiments, the media system tracks the users as they move about the respective physical location, such as by using the position sensor or the AR headset. The AR headset generates an item of furniture for the avatars to sit on or occupy. The furniture may represent the actual furniture of the remote users, or be simulated based on the locations of the avatars in the viewing area. The furniture may be positioned at an angle such that the avatar is facing the screen of the user wearing the AR headset. In embodiments where the avatars move, the furniture may remain fixed in relation to the moving avatar or may move with the avatar.

In some embodiments, the AR headset displays supplemental AR content based on the media asset displayed on the screens. For example, the media asset is a sporting event, the AR headset may display relevant statistics about participants in the event. If the media asset is a movie or TV show, the AR headset may display information about the actors, such as personal information (e.g., name, age, or height) or roles in other movies or TV shows. The supplemental content may also include information about the media asset, such as the present time point in playback of the media asset, time remaining of playback of the media asset, and information about creators or owners of the content, to name a few examples. The supplemental AR content may be displayed off-screen, partially on screen (e.g., lead lines pointing to on-screen content), or entirely on screen. In some embodiments, the supplemental AR content may enhance the media asset on the screen, such as by expanding the scene beyond the screen or by displaying colors or patterns to accent the media asset. In some embodiments, the supplemental AR content may include annotations of the media asset. For example, if the media asset is a presentation and a user marks a portion of the presentation, such as by circling, underlining, highlighting, or pointing, the AR headset displays the annotations. In some embodiments, the annotations may include a poll such as votes on whether to (i) stream a particular media asset, (ii) invite a particular user to the shared media session, or (iii) determine if a media asset featuring a particular actor or actress is preferred, to name a few examples. In some embodiments, the annotations may include a quiz or questions about the media asset displayed.

Using the methods described herein, users in different locations may share a media asset as if all users were present in a single location. The media asset may be shared using a screen of each user. An AR headset displays avatars representing the users in different locations. The avatars may be displayed based on the positions of the users in relation to their respective screens.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 10 depicts an illustrative flow diagram for a process for providing supplemental AR content, in accordance with some embodiments of this disclosure.

DETAILED DESCRIPTION

Figure 1:
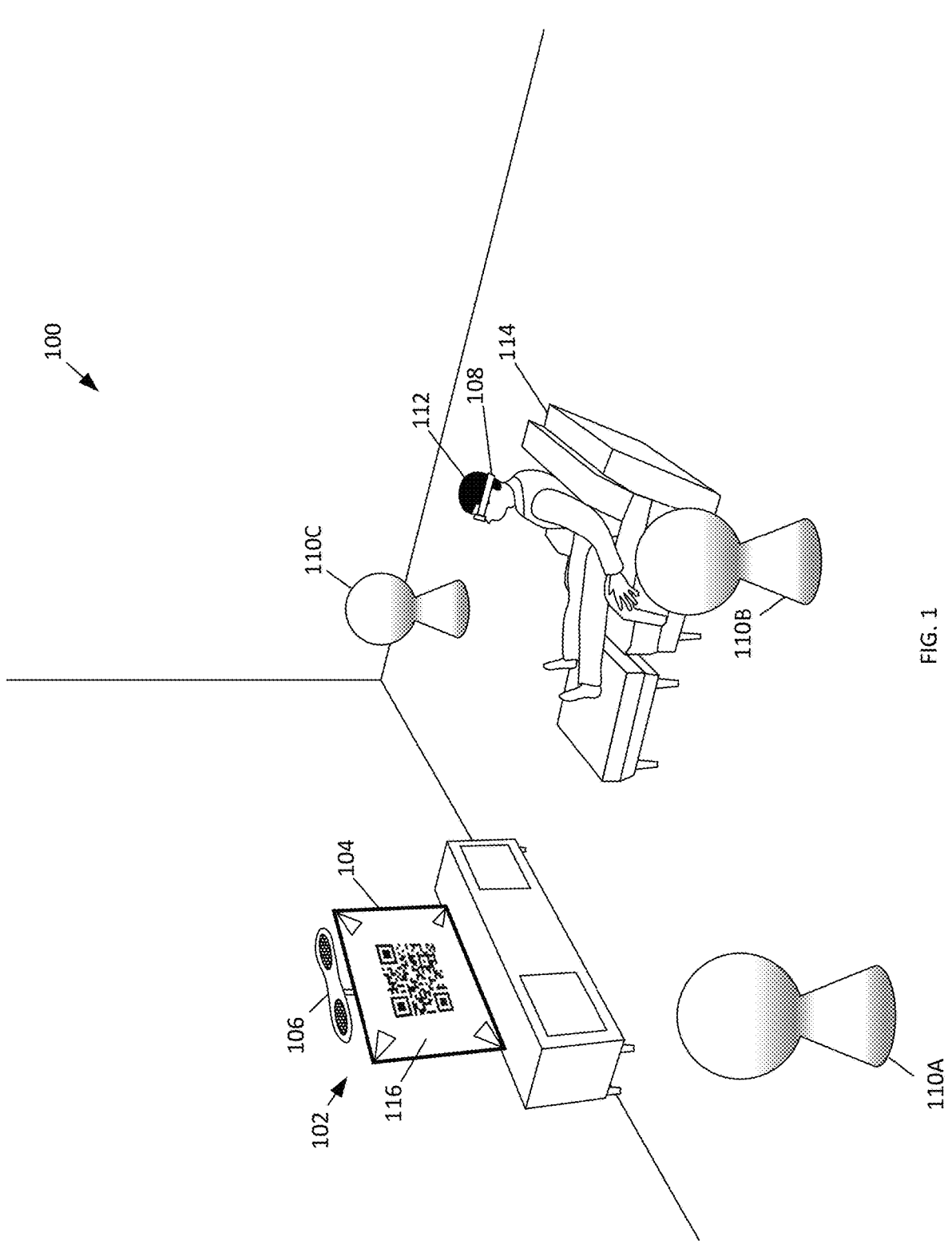
FIG. 1 shows an illustrative diagram of a viewing area where a media asset and augmented reality (AR) content may be provided using a media system, in accordance with some embodiments of the disclosure.

As referred to herein, the phrase "augmented reality" refers to any kind of display of a media asset, or digitally or optically produced content, that overlays a real-world environment. For example, augmented reality (AR) may be provided using goggles or glasses worn by a user. That is, the goggles may allow the user to partially see the real world, while some digitally produced content is overlaid, by the goggles, over the real-world objects to create a mixed reality. In some embodiments, AR may also refer to holographic projection of the media asset that overlays real-world objects or is projected in the real world.

As referred to herein, the phrase "viewing area" refers to any kind of physical area, where display of the media asset may be viewed by one or more users, and physical areas that immediately adjoin such areas. For example, if the media asset is displayed on a display (e.g., a television (TV) screen) in a room, all parts of that room may be considered to be a "viewing area." In some embodiments, such viewing areas may include areas where the media asset is not visible. For example, areas behind or to the side of the TV screen can still be considered within the "viewing area."

As referred to herein, the phrase "display" refers to any device or devices to display the media asset. For example, a screen may be used, such as a TV, computer monitor, or phone screen, to name a few examples. Other devices may include a projector and projection surface or a holographic display.

Users may use a media guidance interface that allows them to efficiently navigate content selections and easily identify content that they may desire to view. The media guidance interface may be used by several users to select content to be shared with the other users. For example, a first user may use the guidance interface to select a movie to view and the guidance interface may display the movie to the other users. An application that provides such guidance is referred to herein as an interactive media guidance application or, sometimes, a media guidance application or a guidance application.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "media equipment device," or "media device" should be understood to mean any device for accessing the content described above, such as a TV, a Smart TV, a set-top box, an integrated receiver decoder (IRD) for handling satellite TV, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer TV (PC/TV), a PC media server, a PC media center, a hand-held computer, a stationary telephone, a personal digital assistant (PDA), a mobile telephone, a portable video player, a portable music player, a portable gaming machine, a smart phone, or any other TV equipment, computing equipment, or wireless device, and/or combination of the same. In some embodiments, the user equipment device may have a camera.

On these user equipment devices, users may be able to navigate among and locate the same content available through a TV. Consequently, media guidance may be available on these devices, as well. The guidance provided may be for content available only through a TV, for content available only through one or more of other types of user equipment devices, or for content available both through a TV and one or more of the other types of user equipment devices. The media guidance applications may be provided as online applications (i.e., provided on a website, or as stand-alone applications or clients on user equipment devices. Various devices and platforms that may implement media guidance applications are described in more detail below.

FIG. 1 shows an illustrative diagram of a viewing area 100 where a media asset (e.g., a registration image 116) and AR content (e.g., avatars 110) may be provided using a media system 102, in accordance with some embodiments of the disclosure. In particular, FIG. 1 shows a content viewing experience between users in different locations.

The media system 102 is configured to process computer-executable instructions to interface with a media streaming device (e.g., display 104), position sensor 106, and AR headset 108. The instructions may be provided by a media guidance application, such as described above.

The display 104 may display a media asset, such the registration image 116, to the user 112. The media asset may be selected by the user 112 or provided by the media system 102 (e.g., the media guidance application. The user 112 may want to stream the media assert with users not present in the viewing area 100 (e.g., remote users). The remote users stream the media asset on respective displays located in their remote viewing areas. The user 112 and remote users initiate or join a shared media session to stream the media asset on the displays (e.g., the display 104 and the respective displays of the remote users). The media system 102 synchronizes the streaming of the media asset between the displays such that the user 112 and remote users view the same media asset at approximately the same time. For example, if the media asset is a movie, the displays may display approximately the same time point in the movie, such as within 5 seconds, such as within 2 seconds, such as within 1 second, such as within 0.5 seconds. Synchronizing streaming allows the user 112 and remote users to comment on or discuss the media asset.

In the depicted embodiment, the registration image 116 (referred to as the image 116) is used to register the user 112 for the shared media session, such as described below. The display 104 is a television (TV) and the media system 102 is built into the TV. The user 112 is sitting on furniture 114 in front of the display 104, which is depicted as a chair and a footrest.

The position sensor 106 may be used to determine dimensional characteristics of the viewing area 100. For example, the media system 102 may determine the position of the user 112 in relation to the display 104, such as the distance and angle from the user 112 to the display 104. The position sensor 106 may determine bounds of the viewing area 100, such as walls, doors, and openings. In the depicted embodiment, the position sensor 106 is positioned on the top of the display 104. The position sensor 106 includes a transceiver that sends data to and receives data from a transceiver of the AR headset 108 through radio waves. In some embodiments, data is sent in short nanosecond pulses over a range of frequencies, such between 3.1 to 10.6 GHz. The time to send and receive the data is used to calculate the position of the AR headset 108, which may also be considered the position of the user 112. In some embodiments, a transceiver may be worn by the user (e.g., not part of the AR headset 108). In some embodiments, one or more transceivers may be held by the user 112 (e.g., as part of a remote or AR controller) or attached to different locations on the user 112 (e.g., chest, back, legs, arms, hands, and feet). The one or more transceivers may be used to determine the position of the user 112 or position of appendages and limbs of the user 112. In some embodiments, the position sensor 106 may communicate with transceivers coupled to portions of the viewing area 100 (e.g., walls, a floor, a ceiling, or corners) or objects in the viewing area 100 (e.g., furniture 114) to determine bounds of the viewing area 100 and map the objects within the viewing area 100. Different techniques may be used with the data to determine the positions, such as time difference of arrival (TDoA), two-way ranging (TWR), angle of arrival (AoA), and phase-difference-of-arrival (PDoA), to name a few examples. In some embodiments, the transceivers are ultra-wideband (UWB) radio transceivers. In some embodiments, the transceivers may use chirp spread spectrum (CSS), Bluetooth® or Bluetooth® low energy (BLE), or Wi-Fi to communicate with one another. In some embodiments, the user 112 may input locations of fixed objects, such as the bounds of the viewing area 100 and objects in the viewing area 100, to the media system 102.

The AR headset 108 displays the avatars 110 (e.g., a first avatar 110A, second avatar 110B, and third avatar 110C) to the user 112. The media system 102 or the AR headset 108 may generate the avatars 110A-C after receiving a request from the user 112 for a social content-viewing experience with the remote users. The avatars 110A-C represent the remote users and the position of the avatars 110A-C in the viewing area 100 is identified based on the position of the remote users in relation to the respective displays, such as described in relation to FIGS. 2A-6. In the depicted embodiment, the user 112 is positioned directly in front of the display 104. The remote user corresponding to the first avatar 110A is positioned to the far left of their respective display. The remote user corresponding to the second avatar 110B is positioned slightly left of their respective display. The remote user corresponding to the third avatar 110C is positioned to the far right of their respective display. The appearance of the avatars 110A-C may be configured by the remote users or determined by the media system 102. In some embodiments, the color, head, face, or accessories of the avatars 110A-C, to name a few examples, may be customizable.

As previously discussed, the user 112 and remote users register with the media system 102 to start the shared media session. The AR headset 108, which includes a camera, may use the image 116 to register the user 112 with the media system 102. The image 116 may include visual encoding of data, such as a QR code, and the AR headset 108 may use the QR code to register the user 112 with the media system 102. For example, the camera of the AR headset 108 may capture an image (e.g., a camera image) of the QR code and process the image to register the user 112. Registration may include providing or confirming the identity of the user 112 or remote user, such as by providing a name or username, user preferences, and position of the user 112, to name a few examples. In some embodiments, the AR headset 108 may communicate directly with the media system 102 to register the user 112, for example, through a wired or wireless connection.

The media system 102 uses the image 116 to calculate the relative position of the user 112 in relation to the display 104. In the depicted embodiment, the image 116 includes fiducials, such as a geometric pattern, which are used to identify the bounds of the display 104. The media system 102 may use the camera image to determine the position of the user 112 by comparing the identified bounds to known dimensions of the display 104.

In some embodiments, the distance between the user 112 and the display 104 may be determined using triangle similarity theorems with the dimensions of the display 104 or the image 116 and characteristics of the camera image (e.g., dimensions of the display 104 or the image 116, as measured in pixels). In some embodiments, characteristics of the AR headset 108 camera (e.g., sensor size, focal length, crop factor, aspect ratio, and scene distance) are used to determine the distance between the user 112 and the display 104. In some embodiments, the media system 102 may determine the angle of the user 112 to the display 104 using the skew of the bounds of the display 104 or the image 116. For example, the bounds of the display 104 the image 116 may be skewed if viewed at an angle. The skewed display 104 or image 116 may be compared to the dimensions of the display 104 or the image 116 when viewed from straight on (e.g., perpendicular or orthogonal) to determine the angle. The distance and the angle may be calculated for each user in relation to their respective screen to which the media asset is streamed, such as the user 112 and the display 104 and the remote users and their displays.

In some embodiments, the QR code of the image 116 may communicate data or a payload to the AR headset 108. For example, the QR code may contain information about the media asset to be streamed, the remote users (e.g., positions, avatar 110 configuration, and names), or characteristics of the display 104 (e.g., capabilities, size, and resolution).

In some embodiments, the media system 102 interfaces with displays, position sensors, and AR headsets of the remote users to determine the positions of each remote user in relation to a respective display. For example, the media system 102 may receive spatial data (e.g., a two-dimensional (2D) or three-dimensional (3D) point cloud) about objects in the viewing area (e.g., viewing area 100) from position sensors (e.g., position sensor 106) of the remote users. The media system 102 may use the spatial data to determine the angle and distance of the remote user corresponding to the first avatar 110A from a center point of their respective display (e.g., display 104). The determined angle and distance is used to identify the position of the first avatar 110A in the viewing area 100. The first avatar 110A is positioned at the same angle and distance from the center point of the display 104 as the determined angle and distance, regardless of the size of the viewing area 100. The same approach is used to identify the positions of the avatars 110B and 110C.

Figure 5A:
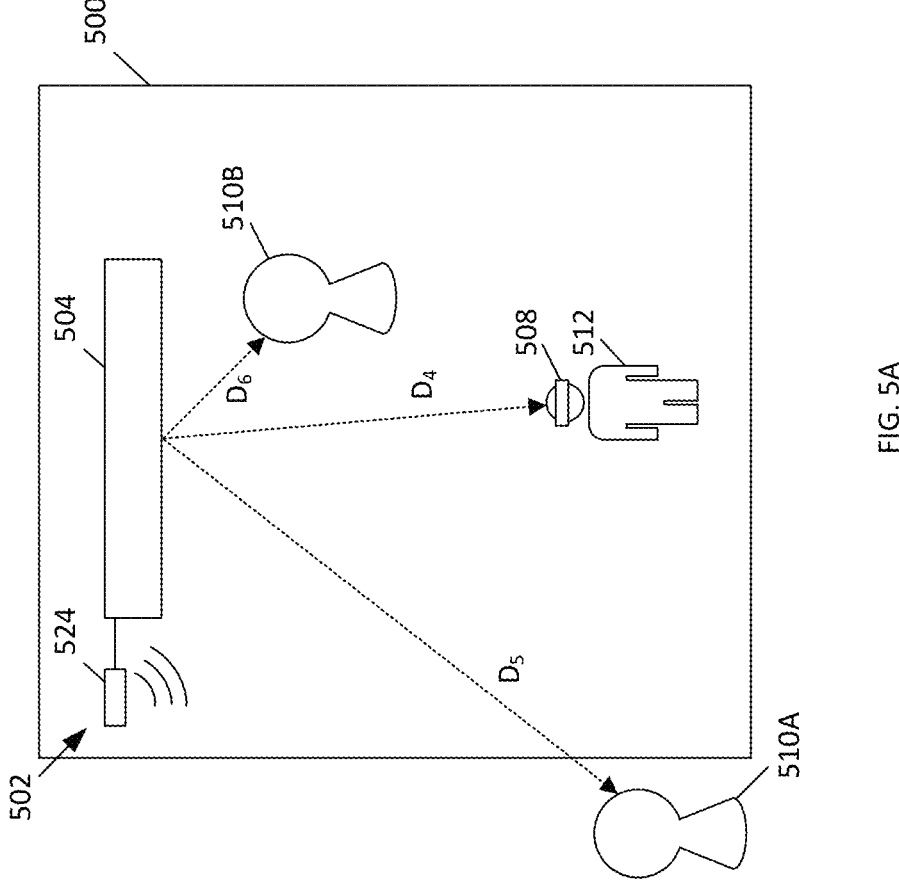
FIGS. 5A-5C show illustrative diagrams of adjusting AR content positioned outside of a viewing area, in accordance with some embodiments of this disclosure.
Figures 5B, 5C:
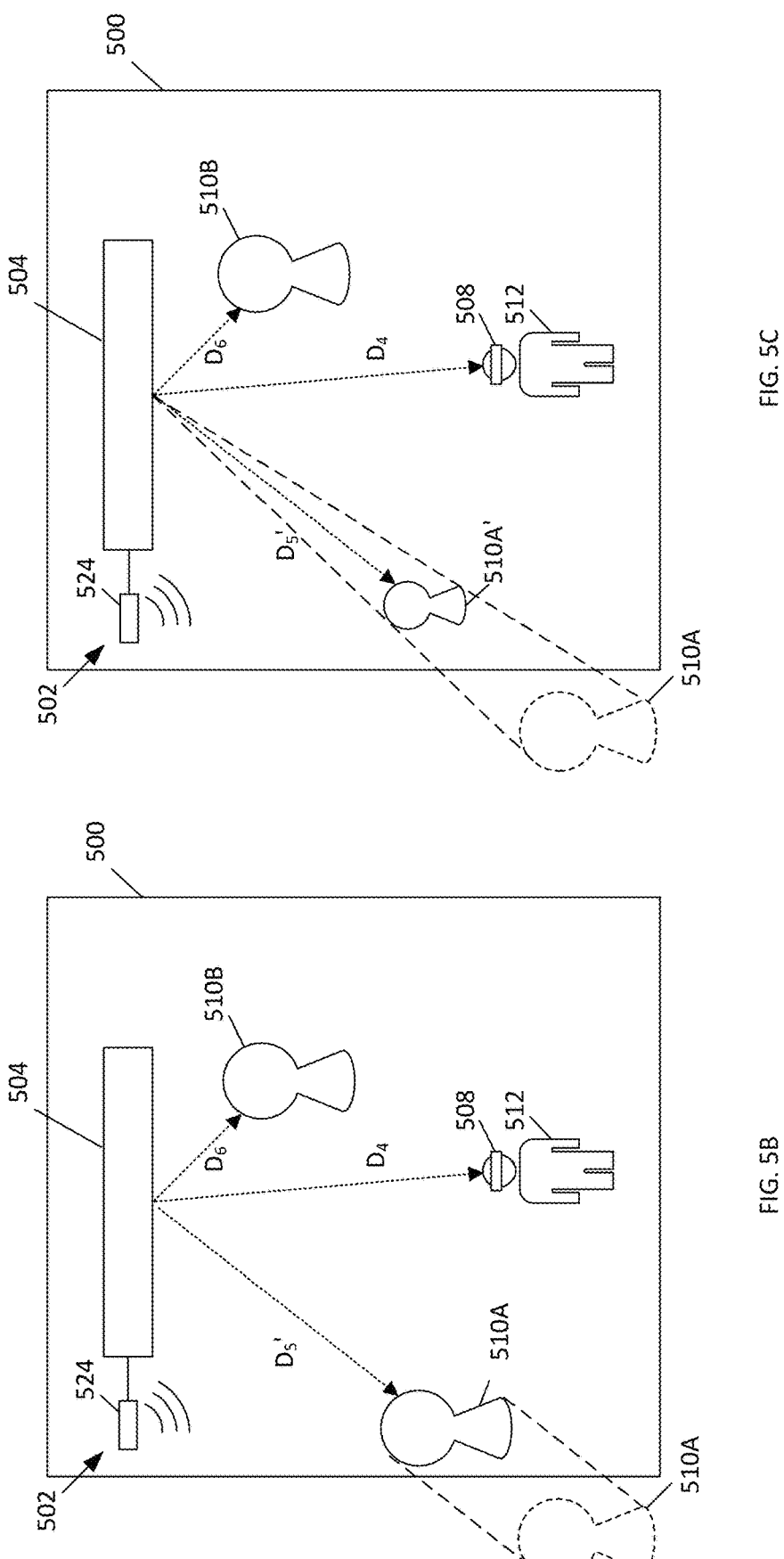

In some embodiments, such as described in relation to FIG. 5A-C, the positions of the remote users in relation to their respective screens may result in the avatars 110A-C being outside of the viewing area 100, and the position of the avatars 110A-C may be adjusted to be inside the viewing area 100. In some embodiments, such as described in relation to FIG. 6, the positions of the remote users in relation to their respective screens may result in the avatars 110A-C overlapping the user 112 or other avatars 110A-C, and the position of the avatars 110A-C may be adjusted to have minimal or no overlay.

In some embodiments, the media asset may be a video, such as a movie. Any of the user 112 or remote users may control the playback of the movie using the media guidance application of the media system 102. Control of playback may include movie selection and streaming control, such as pause, play, fast forward, rewind, zoom in and out, or play from different time locations of the movie. For example, if the user 112 changes playback of the media asset on the display 104, the playback of the media asset on the respective displays of the remote users changes accordingly. In some embodiments, the media asset may be a presentation. Control of the presentation may include selecting slides to present or annotating slides, and may be limited to a subset of users, such as the presenter or a moderator. In some embodiments, the media asset may be 3D content, such as 3D video or a 3D model. Control of playback may include changing an angle the 3D content is viewed or changing a position of the 3D content.

In some embodiments, the media system 102 interfaces with speakers and a microphone. In some embodiments, the AR headset 108 includes the speakers (e.g., headphones) and/or the microphone. In some embodiments, the speakers may be connected to the display 104 (e.g., integral with the TV or an external sound system). The user 112 and remote users may use the speakers and the microphone to speak with one another. In some embodiments, the media system 102 may use spatial audio techniques with the speakers to place the voice of the remote users with their avatar 110A-C.

In some embodiments, the position sensor 106 scans the viewing area 100, for example, by measuring distances to multiple points in the viewing area 100. In such embodiments, the position sensor 106 may include still and video cameras (e.g., optical, RGB, ultraviolet (UV), or IR), sonar, radar, lidar, or lasers to measure distances. In some embodiments, the position sensor 106 includes multiple microphones (e.g., an array of microphones) to capture sounds from different directions when measuring distances. In some embodiments, the position sensor 106 uses an optical and infrared (IR) cameras (or an IR detector) and an IR emitter. In some embodiments, the position sensor 106 may include spatially-separated components (e.g., components positioned on a side of and on top of the display 104). In some embodiments, the position sensor 106 includes more than one type of measurement system.

The position of the user 112 may be calculated using various methods. In some embodiments, the closest point of the user 112 to the position sensor 106 is used to calculate the distance and angle. In some embodiments, the distance and angle are calculated to a center point or centroid of user 112. In some embodiments, the head of the user 112 is used to calculate the distance and angle. In some embodiments, the AR headset 108 is used to calculate the distance and angle. For example, the distance and angle may be calculated using the camera of the AR headset 108 or the closest point of the AR headset 108 to the position sensor 106. The position sensor 106 and/or the AR headset 108 may be used to calculate multiple positions of the user 112, since the user 112 may move about the viewing area 100 over time (e.g., while streaming the media asset). Positions of the remote users corresponding to the avatars 110A-C may be similarly change, and the positions of the avatars 110A-C change accordingly.

In some embodiments, the media system 102 receives global positioning system (GPS) coordinates of the user 112, remote users, bounds of the viewing areas (e.g., viewing area 100) and objects in the viewing areas, to name a few examples. In such embodiments, the position sensor 106 may include a GPS transceiver or receiver.

In some embodiments, the position of the user 112 is calculated in a 3D space. For example, the media system 102 may determine whether the user 112 is sitting, standing, jumping, or pointing, to name a few examples. The media system 102 may determine the positions of the head, arms, legs, or other limbs of the user 112. The media system 102 may track body language, such as posture, gestures, eye position and movement, and facial expressions. The positions and body language may be applied to an avatar (e.g., avatars 110A-C) of the user 112. For example, if a remote user approaches and points to their respective display, the corresponding avatar 110A-C may approach and point to the display 104 (e.g., the avatars 110A-C may have arms or arms may appear when needed). If a remote user appears upset, the corresponding avatar 110A, B, or C may display an upset facial expression (e.g., the avatars 110A-C may have facial features).

In some embodiments, the position of the user 112 may be calculated in a 2D space. For example, the position of the user may be determined using a point of the user as viewed from above, such as in a plane parallel to the floor of the viewing area 100. Using 2D space may reduce the computational power needed to determine the position of the user 112, which may allow reduce cost and complexity for any of the media system 102, position sensor 106, and AR headset 108.

In some embodiments, the remote user corresponding to each of the avatars 110A-C is positioned in front of, and streams to a respective display. In some embodiments, more than one of the remote users may be positioned in front of a respective display. For example, two or more remote users may stream the media asset to one respective display. The media system 102 may determine the position of the two or more remote users in relation to the one respective display.

In some embodiments, the position sensor 106 is used to determine the geometry and positions of the furniture 114. For example, for each item of furniture 114, the media system 102 may determine its shape and its position in relation to the display 104 or other pieces of furniture. For example, in relation to the furniture 114, the media system 102 may determine the shape of the chair and its position in relation to the footrest.

In some embodiments, the AR headset 108 executes the operations performed by the media system 102. In some embodiments, the AR headset 108 determines the position of the user 112. The AR headset 108 may include the position sensor 106 or a motion sensing device such as an inertial measurement system (IMS) to track the multiple positions of the user 112, such as when the user 112 moves about the viewing area 100. In some embodiments, the AR headset 108 identifies the positions of the avatars 110A-C. In some embodiments, the media guidance application provides instructions or commands to the AR headset 108.

Figures 2A, 2B, 2C:
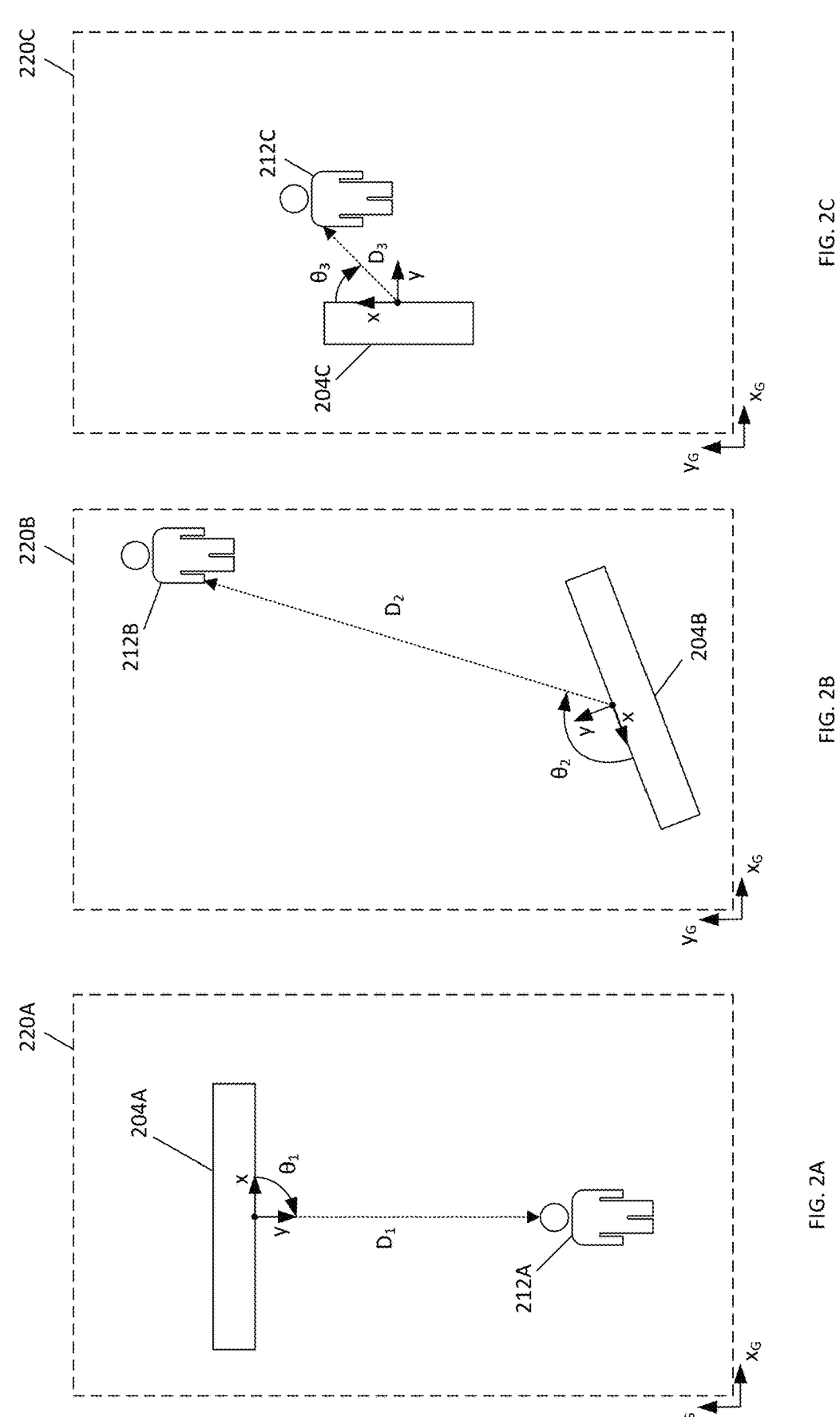
FIGS. 2A-2C show illustrative diagrams of relative positions of different users in relation to a media streaming device, in accordance with some embodiments of this disclosure.

As previously discussed, the position of the avatars 110A-C corresponds to the position of the remote users. FIGS. 2A-2C discuss examples of how to determine the positioning of the remote users.

FIGS. 2A-2C show illustrative diagrams of relative positions of different users 212 (e.g., a first user 212A, a second user 212B, and a third user 212C) in relation to a media streaming device 204 (e.g., a first TV 204A, a second TV 204B, and a third TV 204C), in accordance with some embodiments of this disclosure. In particular, FIGS. 2A-2C show the users 212A-C at different positions in relation to a reference point, such as the center point, of the TVs 204A-C. Each of the TVs 204A-C may be a different size and/or orientation. The positions of the users 212A-C in relation to the media streaming devices 204 may be referred to as relative positions of the users 212.

FIG. 2A shows the first user 212A positioned at a first distance $(D_1)$ and a first angle $(\theta_1)$ from the front of the first TV 204A. FIG. 2B shows the second user 212B positioned at a second distance $(D_2)$ and a second angle $(\theta_2)$ from the front of the second TV 204B. FIG. 2C shows the third user 212C positioned at a third distance $(D_3)$ and a third angle $(\theta_3)$ from the front of the third TV 204C. In the embodiment depicted in FIGS. 2A-2C, the distances $D_1$-$D_3$ are different from one another and the angles $\theta_1$-$\theta_3$ are different from one another.

FIGS. 2A-2C are hereafter described together. The users 212A-C and the TVs 204A-C are shown in first, second, and third frames of reference 220A-C, respectively. The frames of reference 220A-C are for illustrative purposes, but may include viewing areas or be located within viewing areas. Each frame of reference 220A-C has a local coordinate system (i.e., x and y axes) based on the TVs 204A-C. The local coordinate systems have an origin at the center point of the TVs 204A-C. The x-axis extends along the front of the TVs 204A-C and the positive direction is to the right side (as viewed by the users 212A-C). The y-axis extends outward from the front of the TVs 204A-C.

The local coordinate systems are oriented differently in relation to a global coordinate system (i.e., $X_G$ and $Y_G$ axes) as viewed from above. In the depicted embodiment, the x-axis of the first TV 204A is shown as aligned with the $X_G$-axis and the positive y-axis as aligned with the negative $Y_G$-axis. The x-axis of the third TV 204C is shown as aligned with the $Y_G$ axis and the positive x-axis as aligned with the positive $Y_G$-axis. The x-axis of the second TV 204B is shown at an angle to the $X_G$ and $Y_G$ axes and the positive y-axis as extending in the positive $Y_G$ and negative $X_G$ axes.

The distances $D_1$-$D_3$ are measured from the origin of the local coordinate systems (e.g., the center of the front of the TVs 204A-C). The distances $D_1$-$D_3$ may be calculated using various methods, such as those discussed in relation to FIG. 1. The angles $\theta_1$-$\theta_3$ are measured from the positive x-axes (e.g., the front of the TVs 204A-C) to the distance lines $D_1$-$D_3$ (shown as dashed lines).

In some embodiments, the distances $D_1$-$D_3$ and angles $\theta_1$-$\theta_3$ may be measured from the position sensor 106 (FIG. 1). In some embodiments, the media guidance application may translate the distances $D_1$-$D_3$ measured from the position sensor 106 to the center point of the TVs 204A-C or vice versa.

In some embodiments, the global and/or local coordinate systems may differ. For example, the x and y axes may be swapped, or at least one of the positive directions of the axes may be reversed. In some embodiments, the origin the x and y-axes may be in a different location. For example, the origin may be at a left or rightmost side of the TVs 204A-C or may be at the position sensor 106 (FIG. 1).

The frame of references 220A-C may be repositioned and aligned to create a shared frame of reference. The shared frame of reference has a common reference point that is used to determine the positions of the users 212A-C in the shared frame of reference, which may be referred to as translated positions, is determined using the common reference point. to determine the positions of the users 212A-C in relation to a common reference point, which may be referred to as translated positions. FIGS. 3A-3D discuss examples of how to translate the relative positions to the shared frame-of-reference. The relative positions of the users 212A-C may be translated to a shared frame-of-reference to determine the positions of the users 212A-C in relation to a common reference point (e.g., translated positions). The translated positions may be used to identify positions of avatars corresponding to the users 212A-C. FIGS. 3A-3D discuss examples of how to translate the relative positions to the shared frame-of-reference to create the translated positions.

Figures 3A, 3B, 3C:
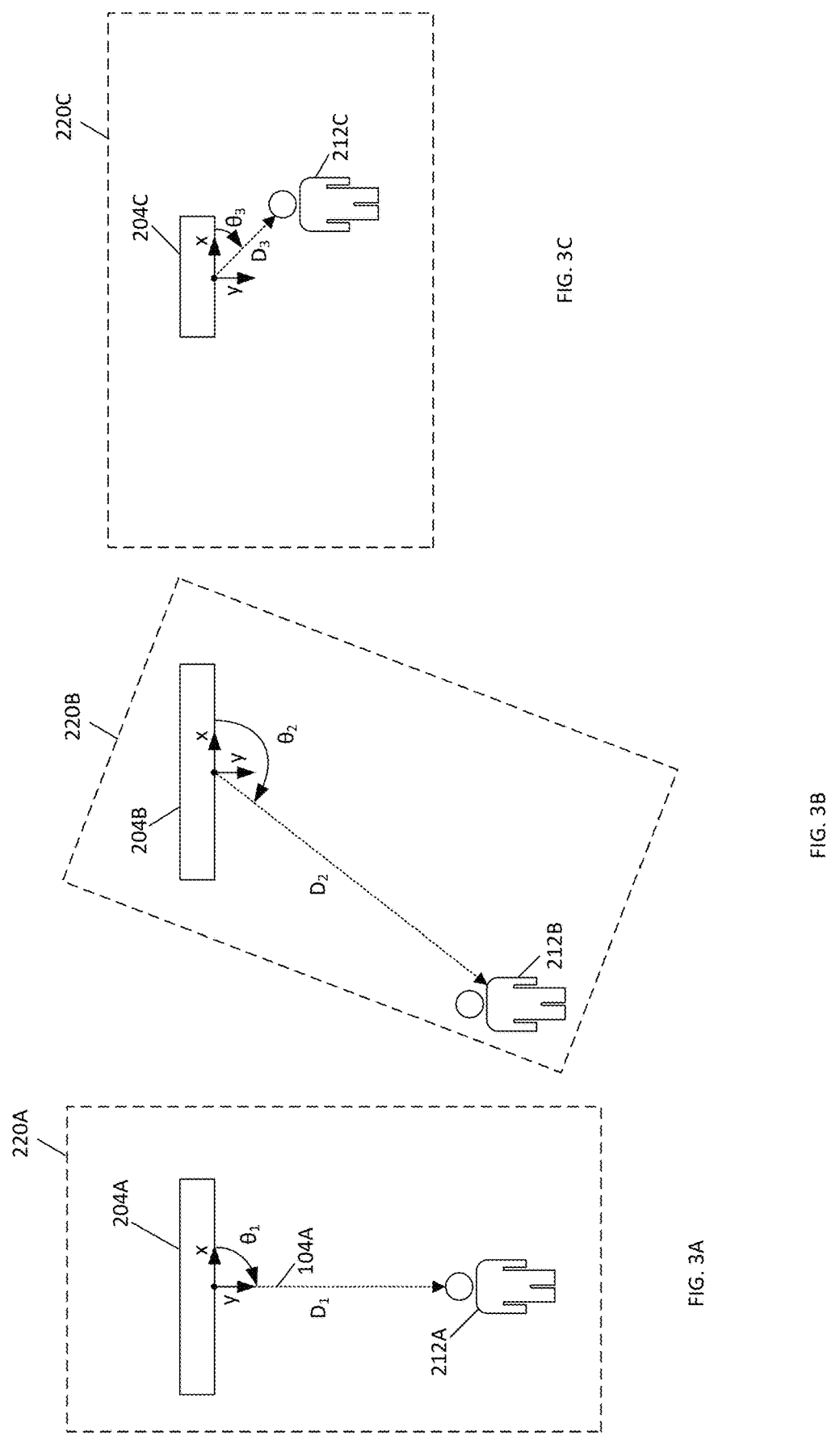
FIGS. 3A-3C show illustrative diagrams of translated positions of different users in relation to a media streaming device, in accordance with some embodiments of this disclosure.

FIGS. 3A-3C show illustrative diagrams of translated positions of the users 212A-C in relation to the media streaming device 204 (e.g., the TVs 204A-C), in accordance with some embodiments of this disclosure. FIGS. 3A-C are described together for clarity.

The media system 102 (FIG. 1) may rotate the frames of reference 220A-C, such as in a virtual space, to create the translated positions. The virtual space may reside in a memory of the media system 102, such as described in FIG. 10. The frames of reference 220A-C are rotated such that the TVs 204A-C are oriented the same. In the depicted embodiment, the frames of reference 220A-C are aligned by aligning the local coordinate systems (e.g., the center point and front of the TVs 204A-C). The translated positions of the users 212A-C from the aligned frames of reference 220A-C may be placed in a shared frame-of-reference, such as described in relation to FIG. 3D.

Figure 3D:
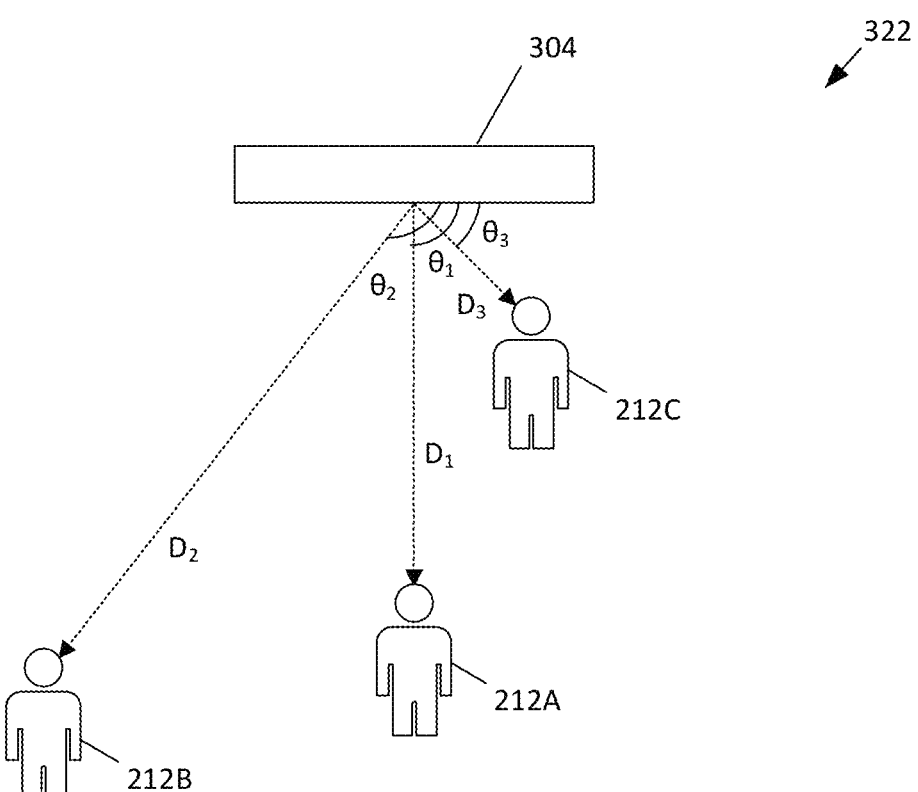
FIG. 3D shows an illustrative diagram of the translated positions of the different users of FIGS. 3A-3C in a shared coordinate space, in accordance with some embodiments of this disclosure.

FIG. 3D shows an illustrative diagram of the translated positions of the users 212A-C of FIGS. 3A-3C in a shared coordinate space (e.g., a shared frame-of-reference 322), in accordance with some embodiments of this disclosure. In particular, FIG. 3D shows the users 212A-C in the shared frame-of-reference 322 as if present in one viewing area (e.g., the viewing area 100 in FIG. 1).

The users 212A-C are positioned in relation to a shared media streaming device 304. The shared media streaming device 304 may represent a display, such as one of the TVs 204A-C discussed in relation to FIGS. 2A-3C. The distances $D_1$-$D_3$ and angles $\theta_1$-$\theta_3$ are used to place the users 212A-C.

The translated positions may be used to generate avatars (e.g., the avatars 110A-C in FIG. 1) of the users 212A-C. In one embodiment, the media system 102 described in FIG. 1 may use the translated positions as the positions of the avatars 110A-C. The AR headset 108 generates the avatars 110A-C for display to the user 112.

The illustrative diagrams in FIGS. 2A-3D exemplify how to determine a position of a user in relation to a screen and how to identify a position for an avatar of the user in relation to a screen of a different user. In some embodiments, the embodiments discussed in FIGS. 2A-3D may be performed by the media system 102 discussed in relation to FIG. 1.

Figure 4:
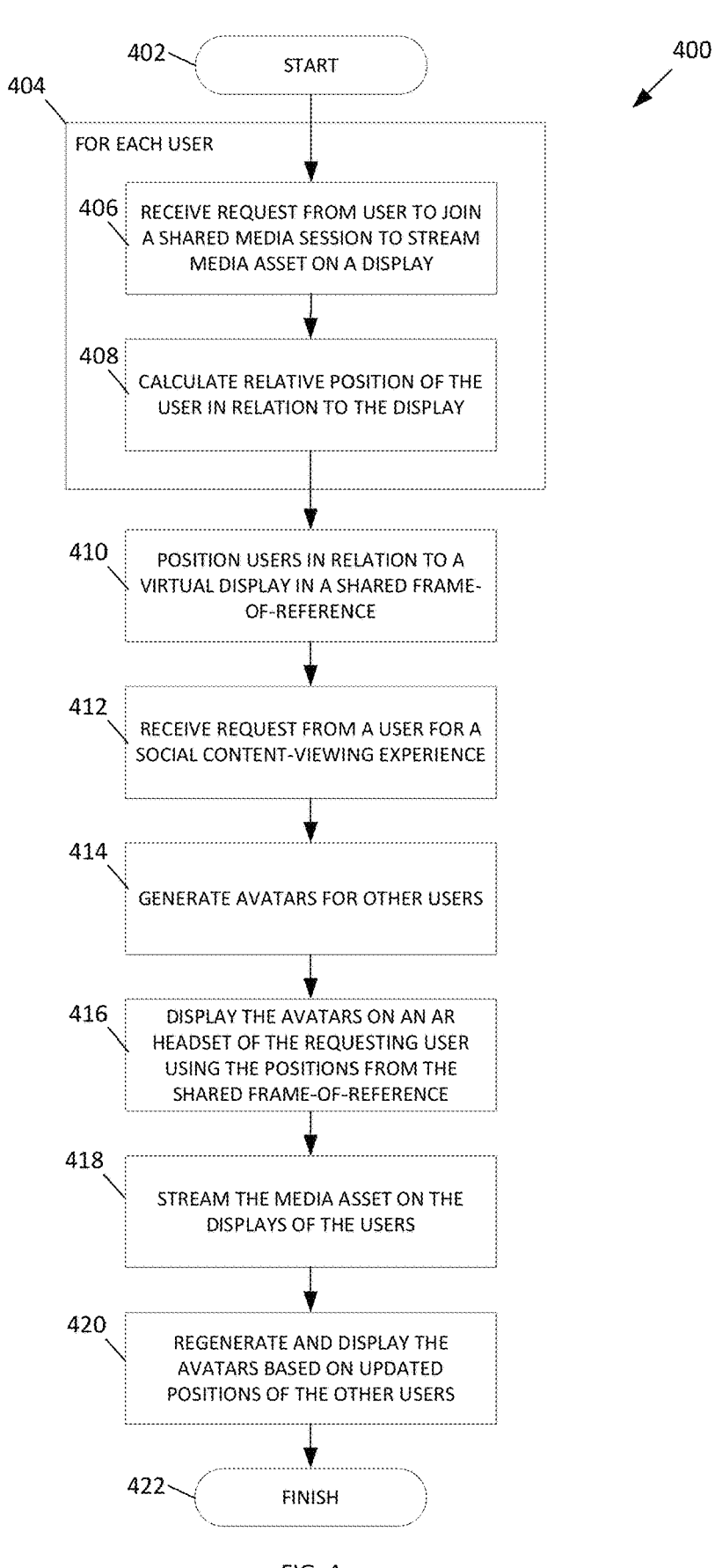
FIG. 4 depicts an illustrative flow diagram for a process for providing a media asset and AR content, in accordance with some embodiments of this disclosure.

FIG. 4 depicts an illustrative flow diagram for a process 400 for providing a media asset (e.g., image 116 in FIG. 1) and AR content (e.g., avatars 110A-C in FIG. 1), in accordance with some embodiments of this disclosure. The processes shown in FIG. 4 may be implemented, in whole or in part, by one or more systems or devices described herein.

The process 400 starts at operation 402 with users (e.g., users 112 and 212A-C in FIGS. 1-3D) starting a shared media session, e.g., using control circuitry (e.g., control circuitry 804, 911 described below in FIGS. 8 and 9), to stream the media asset, such as described above with respect to FIG. 1. The shared media session may be hosted on the server described in relation to FIG. 9. The process 400 continues to operation 404 where operations 406 and 408 are performed for each user. At operation 406, the process 400 continues with receiving, e.g., using I/O circuitry (I/O path 802, 914 described below in FIGS. 8 and 9), a request from the user to join a shared media session to stream the media asset on a display (e.g., display 104 and TVs 204A-C in FIGS. 1-3C) of the user, such as described above with respect to FIG. 1. At operation 408, the process 400 continues with calculating, e.g., using the control circuitry, a relative position of the user in relation to the display, such as described above with respect to FIGS. 2A-C. The display of each user may be used to stream the same media asset. The user device 801 in FIG. 8 or the server 904 in FIG. 9 may receive the request from the users and calculate the relative positions. User requests may be inputted through user devices 800 or 801 in FIG. 8 or user equipment devices 907, 908, 909, 910 in FIG. 9. The process 400 continues to operation 410 with positioning the users, e.g., using the control circuitry, in relation to a virtual display (e.g., the shared media streaming device 304 in FIG. 3D) in a shared frame-of-reference (e.g., shared frame-of-reference 322 in FIG. 3D), such as described above with respect to FIG. 3D. The process 400 continues to operation 412 with receiving, e.g., using the I/O circuitry, a request from a user for a social content-viewing experience, such as described above with respect to FIG. 1. The process 400 continues to operation 414 with generating avatars (e.g., avatars 110A-C in FIG. 1), e.g., using the I/O circuitry, for the other users, such as described above with respect to FIGS. 1-3D. In some embodiments, the control circuitry may generate the avatars.

Figure 8:
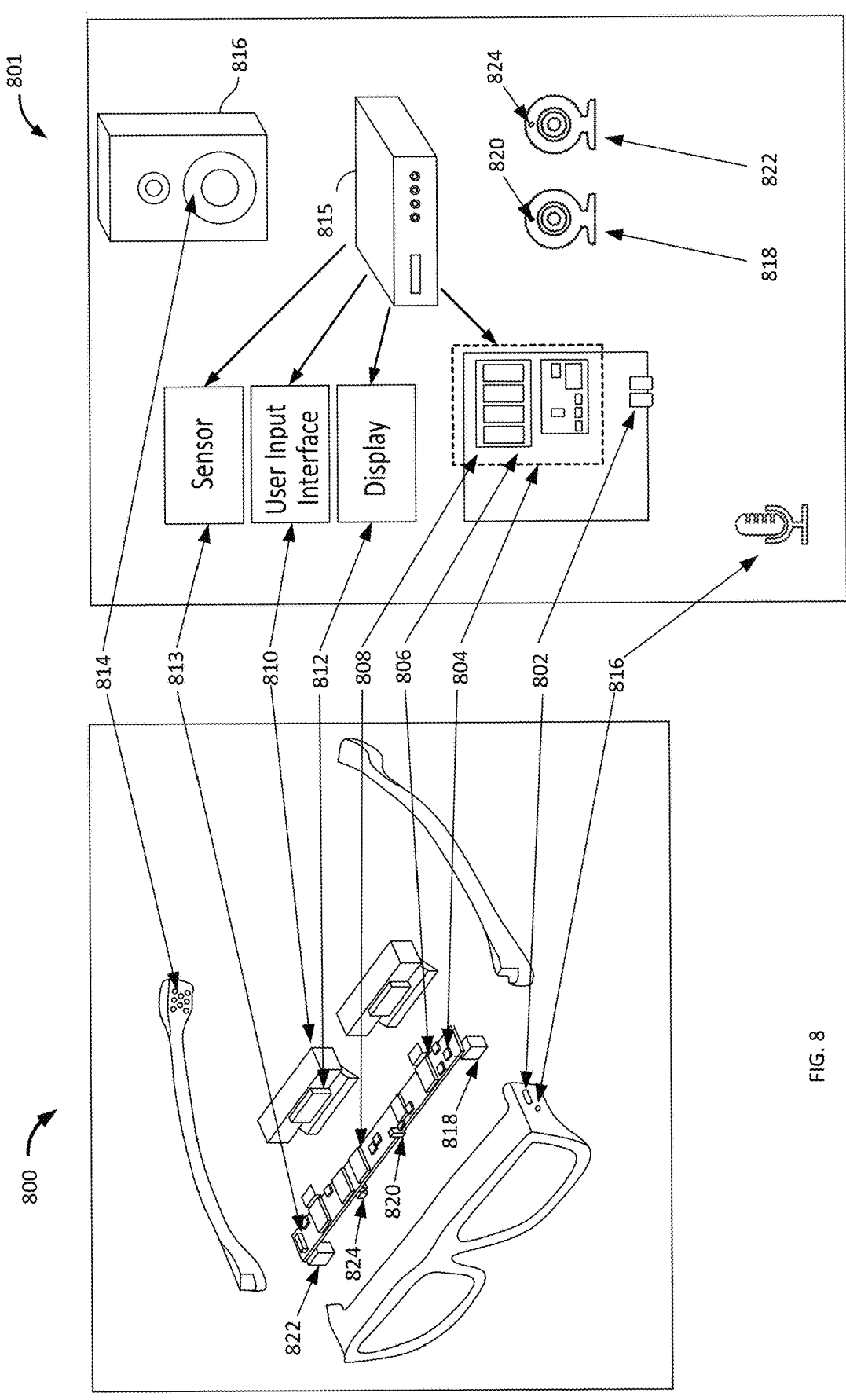
FIG. 8 shows illustrative user equipment devices, in accordance with some embodiments of this disclosure.
Figure 9:
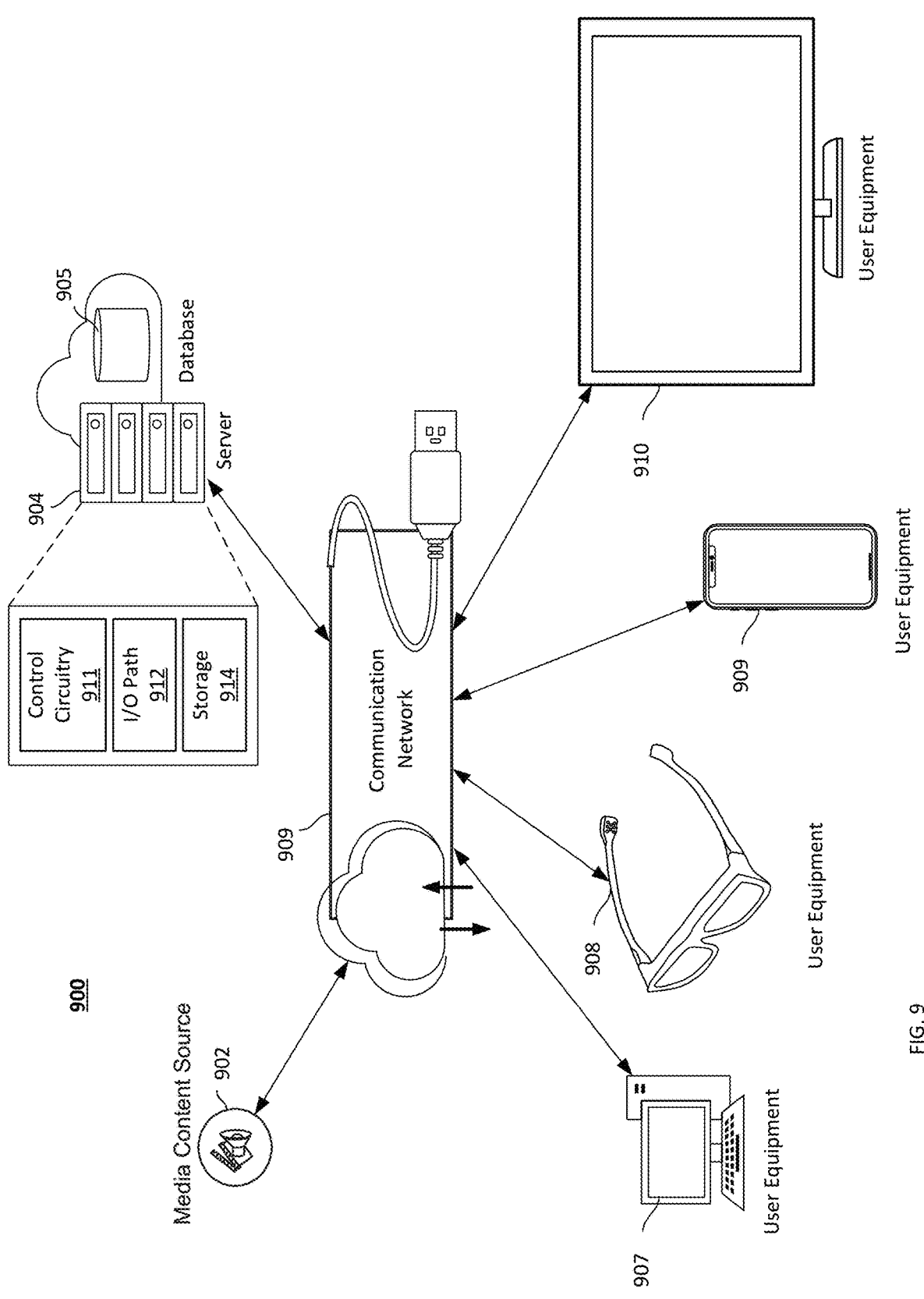
FIG. 9 shows illustrative systems, in accordance with some embodiments of this disclosure.

The user device 801 in FIG. 8 or the server 904 in FIG. 9 may perform the operations 410, 412, and 414. In some embodiments, the user device 800 in FIG. 8 or user equipment devices 907, 908, 909, 910 in FIG. 9 perform the operations 410, 412, and 414. The process 400 continues to operation 416 with displaying, e.g., using the I/O circuitry, the avatars on an AR headset (e.g., AR headset 108 in FIG. 1) of the requesting user, such as described above with respect to FIGS. 1 and 3D. In some embodiments, the AR headset generates the avatars in operation 414. In some embodiments, the user device 800 in FIG. 8 or user equipment devices 907, 908, 909, 910 in FIG. 9 display the avatars. The avatars may be positioned in a viewing area (e.g., viewing area 100 in FIG. 1) of the user using the positions from the shared frame-of-reference, where the positions in relation to the virtual display are applied to the display of the user to position the avatars in the viewing area. The process 400 continues to operation 418 with the user streaming the media asset, e.g., using the control circuitry, on the display, such as described above with respect to FIGS. 1 and 3D. Each user may have a different display, but the displays stream the same media asset. The user device 801 in FIG. 8 or the server 904 in FIG. 9 may stream the media asset to the displays. The process 400 continues to operation 420 with regenerating and displaying, e.g., using the I/O circuitry, the avatars based on updated positions of the other users, such as described in relation to FIG. 1. The process 400 concludes at operation 422 with ending streaming of the media asset, e.g., using the control circuitry, and ending the shared media session. In some embodiments, the I/O circuitry may be used to stream the media asset.

The position of at least one of the avatars may be beyond or outside the bounds of the viewing area. The position of at least one of the avatars may coincide with or overlay the requesting user. In some embodiments, the outside the bounds position may be adjusted as discussed in relation to FIG. 5A-5C. In some embodiments, the overlaying position may be adjusted as discussed in relation to FIG. 6.

FIGS. 5A-5C show illustrative diagrams of adjusting AR content (e.g., a first avatar 510A) positioned outside of a viewing area 500, in accordance with some embodiments of this disclosure.

FIG. 5A shows an illustrative diagram of the first avatar 510A, which is positioned outside of the viewing area 500 of a user 512.

A media system 502 includes a media equipment device 524. The media system 502 interfaces with a display 504 and an AR headset 508 located in the viewing area 500. In the depicted embodiment, the media equipment device 524 connects to the display 504 and wirelessly communicates with the AR headset 508 to process computer-executable instructions, which may be provided by the media guidance application discussed in relation to FIG. 1. The user 512 is positioned at a fourth distance ($D_4$) from the display 504 and wears the AR headset 508. The AR headset 508 may display the first avatar 510A and a second avatar 510B, which represent users in remote locations (e.g., remote users). The media system 502 may identify the positions of the first and second avatars 510A and 510B to be a fifth ($D_5$) and sixth ($D_6$) distance from the display 504, such as discussed in relation to FIG. 3D. The media system 502 may identify the positions of the first and second avatars 510A and 510B are at angles from the display 504, such as previously discussed in relation to FIGS. 2A-3D.

As previously discussed, the first avatar 510A is shown outside of the viewing area 500. The media system 502 may have identified the position of the first avatar 510A as discussed in FIG. 3D. Some users (e.g., the user 512) may consider the "outside-bounds" position of the first avatar 510A to lessen the social content-viewing experience. The first avatar 510A may appear to be at a position beyond the viewing area 500, which would normally not be visible to the user 512. The user 512 may prefer to translate (e.g., move) the position of the first avatar 510A to be inside the viewing area 500, such as described in relation to FIGS. 5B and 5C.

FIG. 5B shows an illustrative diagram of the first avatar 510A moved to a different position within the viewing area 500. In particular, the first avatar 510A is shown translated from the fifth distance $D_5$ to an adjusted fifth distance ($D_5'$), while maintaining approximately the same angle from the display 504, such as within +/−5 degrees, such as within +/−2 degrees, such as within +/−1 degree, such as within +/−0.5 degrees. The adjusted fifth distance $D_5'$ places the first avatar 510A at a position inside the viewing area 500. The media system 502 adjusts the position of the first avatar 510A before generating the first avatar 510A for display on the AR headset 508.

In some embodiments, the media system 502 may prompt the user 512 to determine whether the user 512 requests to move the outside-bounds position of the first avatar 510A. In some embodiments, the media system 502 may prompt the remote user corresponding to the first avatar 510A to move to a position that results in the first avatar 510A being positioned in the viewing area 500.

FIG. 5C shows an illustrative diagram of a scaled first avatar 510A' positioned within the viewing area 500. The scaled first avatar 510A' is positioned at the adjusted fifth distance $D_5'$, and at approximately the same angle from the display 504 as the fifth distance $D_5$. The size of the scaled first avatar 510A' is scaled in proportion to the difference between the fifth $D_5$ and adjusted fifth $D_5'$ distances. For example, the first avatar 510A decreases linearly in size as it is translated to the adjusted fifth $D_5'$ distance. In some embodiments, the size of the scaled first avatar 510A' is scaled with the position of the corresponding remote user in relation to a display or screen of the corresponding remote user.

In some embodiments, the avatars 510A and 510B may be scaled based on the size of the viewing area 500. For example, the avatars 510A and 510B may be scaled down (e.g., such as scaled first avatar 510A') (i) if the viewing area is smaller than a predetermined area or dimensions or (ii) at the request of the user 512. In some embodiments, if the viewing area 500 is smaller or larger than viewing areas of the remote users corresponding to the avatars 510A and 510B, the avatars 510A and 510B may be scaled accordingly. In some embodiments, the avatars 510A and 510B may be scaled based on a distance from the user 512 (e.g., a larger distance from the user 512 corresponds to a smaller avatar 510A or 510B and vice versa). In some embodiments, the avatars 510A and 510B are scaled linearly with the distance from the user 512. In some embodiment, the avatars 510A and 510B are scaled based on perspective projection or "weak" perspective projection.

While the embodiments discussed in relation to FIG. 5A-5C discuss adjusting the position of the first avatar 510A, in some embodiments the position may not be adjusted and the first avatar 510A may remain positioned outside the viewing area 500, such as at the fifth distance $D_5$.

In some embodiments, an angle of the first avatar 510A to the display 504 may be changed to position the first avatar in the viewing area 500. The angle may be changed instead of the distance $D_5$, or in addition to the distance $D_5$. In some embodiments, the first avatar 510A may be repositioned based on the minimum distance required to be in the viewing area 500.

In some embodiments, the media equipment device 524 includes or interfaces with a position sensor (e.g., position sensor 106 in FIG. 1). The media equipment device 524 may use the position sensor to determine the bounds of the viewing area 500 and the position of the user 512. In some embodiments, the positions of the avatars 510A and 510B may be normalized to the size of the smallest viewing area to ensure the avatars 510A and 510B are positioned inside the bounds of the viewing areas. For example, the remote users of the avatars 510A and 510B are each positioned in a remote viewing area that may have different dimensions than the viewing area 500. The smallest length and smallest width of the viewing area 500 and remote viewing areas may be used to normalize the position of the avatars. The smallest length and width may be used from different viewing areas. In another example, the positions of the avatars 510A and 510B may be normalized to the viewing area having the smallest area.

In some embodiments, the remote users corresponding to the avatars 510A and 510B move about the remote viewing areas over time. The position of the avatars 110A-C moves about the viewing area 500 accordingly. In embodiments where the positions of the avatars 110A-C are adjusted, such as discussed in relation to FIGS. 5B and 5C, the avatars 110A-C may move in accordance with the adjustments. For example, if the remote user of first avatar 510A moves five feet towards the display 504 from the position at the adjusted fifth distance $D_5'$, the first avatar 510A may move a distance less than five feet (e.g., four feet).

Figure 6:
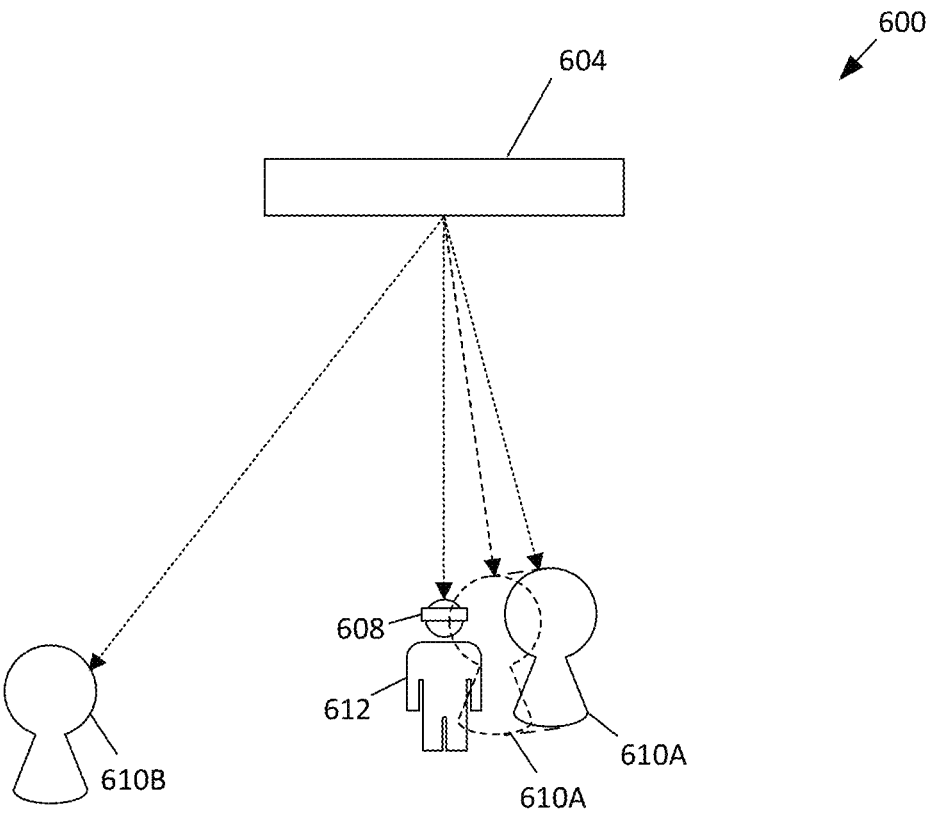
FIG. 6 shows an illustrative diagram of adjusting a position of AR content overlaying a user in a viewing area, in accordance with some embodiments of this disclosure.

FIG. 6 shows an illustrative diagram of adjusting a position of AR content (e.g., a first avatar 610A) that overlays a user 612 in a viewing area 600, in accordance with some embodiments of this disclosure.

The user 612 is positioned in front of a display 604 and wears an AR headset 608 that displays the first avatar 610A and a second avatar 610B. A media system (e.g., media systems 102 and 502 in FIGS. 1 and 5A) may identify positions for the first and second avatars 610A and 610B, such as discussed in relation to FIG. 3D. In the depicted embodiment, the identified position of the first avatar 610A partially overlays, overlaps, or intersects the user 612. The media system may adjust the position of the first avatar 610A before generating the first avatar 610A for display on the AR headset 608. For example, the first avatar 610A is repositioned by changing a distance and/or an angle to the display 604, such as described in relation to FIGS. 5A-5C.

In some embodiments, the first avatar 610A may be repositioned, or offset, to have a minimal overlay with the user 612. For example, a certain percentage of the volume or area of the first avatar 610A may overlay the user 612, such as less than 20%, such as less than 10%, such as less than 5%, such as less than 2%, such as less than 1%. In some embodiments, the first avatar 610A may be repositioned such that there is no overlay. In some embodiments, the first avatar 610A may be repositioned a minimum distance away from the user 612. For example, the first avatar 610A may be repositioned at least 1 in. away from the user 612, such as at least 2 in., such as at least 6 in., such as at least 1 ft. In some embodiments, the avatars 610A-C may overlap another. At least one of the overlapping avatars 610A-C may be repositioned to have minimal overlay.

In some embodiments, the user 612 may determine the overlay percentage or minimum distance. In some embodiments, the media system may prompt the user 612 to determine whether the user 612 requests to move the first avatar 610A. In some embodiments, the media system may prompt the remote user of the first avatar 610A to move to a different position.

In some embodiments, the first avatar 610A may be repositioned to have a minimal overlay with an object in the viewing area 600, such as an item of furniture (e.g., furniture 114 in FIG. 1). In some embodiments, the first avatar 610A may be repositioned to have no overlay with objects in the viewing area 600. In some embodiments, the first avatar 610A may be repositioned to be a minimum distance away from objects in the viewing area 600.

Figure 7:
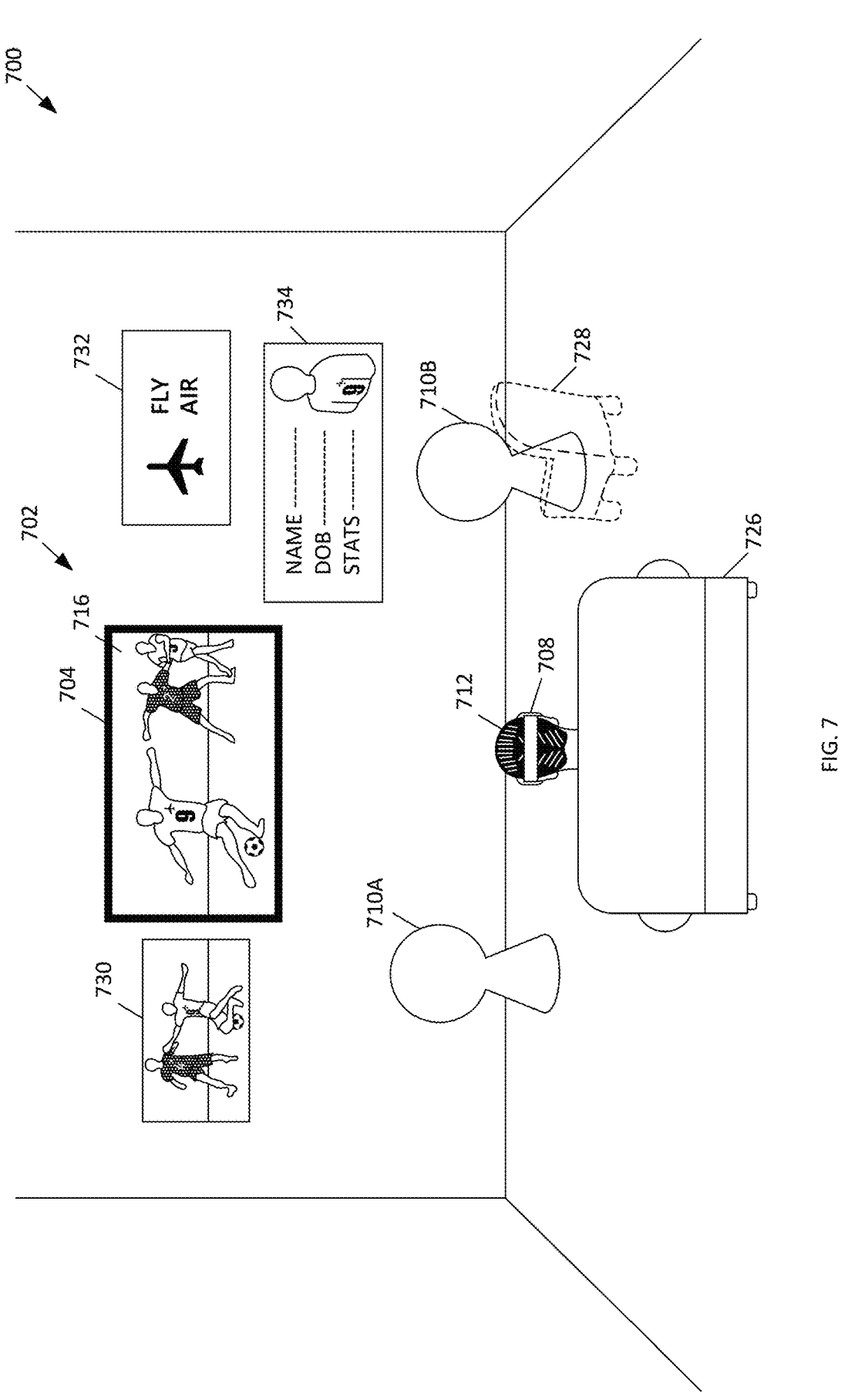
FIG. 7 shows an illustrative diagram of a viewing area having supplemental AR content, in accordance with some embodiments of this disclosure.

FIG. 7 shows an illustrative diagram of a viewing area 700 having supplemental AR content (e.g., AR content 730, 732, and 734), in accordance with some embodiments of this disclosure.

The viewing area 700 may include a display 704 streaming a media asset 716. A media system 702, which may be integral with the display 704, interfaces with the display 704 to control the streaming of the media asset 716, such as described in relation to FIG. 1. In the depicted embodiment, the media asset 716 is a sporting event (e.g., a soccer game). A user 712 is positioned in front of the display 704 and wears an AR headset 708. The media system 702 identifies positions in the viewing area 700 for the first and second avatars 710A and 710B, such as discussed in relation to FIGS. 2C-6. The AR headset 708 generates the first and second avatar 710A and 710B for display at the identified positions.

In the depicted embodiment, the user 712 sits on an item of furniture, such as a couch 714. The second avatar 710B may sit on an item of furniture, which is shown as a chair 728 (in phantom). The chair 728 may be physically present in the viewing area 700, or may be generated for display using the AR headset 708. The chair 728 may be generated based on a predetermined furniture selection, a furniture selection by the user 712, or furniture used by a remote user corresponding to the second avatar 710B, to name a few examples. In some embodiments, the chair 728 is selected from a library of 3D furniture to best match a posture of the remote user corresponding to the second avatar 710B. In some embodiments, the media system 702 or the user 712 may rotate the chair 728. The chair 728 may remain stationary in relation to the viewing area 700 or may move with the second avatar 710B.

The AR headset 708 generates the AR content 730, 732, and 734 for display. A first AR content 730 is an alternative camera angle of the media asset 716. A second AR content 732 is an advertisement based on what is shown in the media asset 716 (e.g., a sponsor shown on an athlete's uniform). A third AR content 734 includes information and statistics based on what is shown in the media asset 716 (e.g., information and statistics about an athlete).

In some embodiments, more or less supplemental AR content may be displayed. In some embodiments, the user 712 may control what supplemental AR content is displayed. In some embodiments, the media system may control what supplemental AR content is displayed. In some embodiments, the user 712 and the remote users corresponding to the first and second avatars 710A and 710B may all view the same supplemental AR content.

In some embodiments, the supplemental AR content may be considered virtual content. The virtual content may be created by the user 712 or by any of the remote users. For example, the user 712 may request the third AR content 734 be displayed by AR headsets of the remote users. In some embodiments, the virtual content may include annotations of the media asset 716 or of the supplemental AR content. For example, the remote user corresponding to the first avatar 710A may pause the media asset 716 (e.g., the sporting event) and circle a portion of the media asset 716 (e.g., a player in the sporting event). A position sensor (e.g., position sensor 106 in FIG. 1) or the AR headset of the remote user may determine the portion of the media asset 716 that has been annotated by monitoring the remote user (e.g., for hand gestures) in relation to the display or AR content 730, 732, 734. In some embodiments, a remote having any of motion sensing, gesture recognition, and pointing capabilities may be used by the remote user for the annotations. The media system 702 or AR headset 708 may interface with the remote. The media system 702 or the AR headset 708 generates the annotations and the AR headset 708 displays them to the user 712.

FIGS. 8 and 9 describe illustrative devices, systems, servers, and related hardware for providing a social content-viewing experience, in accordance with some embodiments of this disclosure.

FIG. 8 shows generalized embodiments of illustrative user devices 800 and 801, which may correspond to any of the devices 102, 104, 106, 108, 204A-C, 502, 504, 508, 524, 604, 608, 702, 704, 708 of FIGS. 1, 2, 5, 6, and 7, or any other suitable devices, or any combination thereof. For example, user equipment device 800 may be smart glasses, a virtual reality device, an AR device (e.g., AR headsets 108, 508, 608, 708 in FIGS. 1 and 5A-7), a projector or hologram projector, a smartphone device, a tablet, a smart mirror, or any other suitable device capable of displaying avatars (e.g., avatars 110A-C, 510A-B, 610A-B, 710A-B in FIGS. 1, 5A-5C, 6, and 7) in a viewing area (e.g., viewing area 100, 500, 600, 700 in FIGS. 1, 5, 6, and 7) and capable of transmitting and receiving data over a communication network. In another example, user equipment device 801 may be a user TV equipment system, smart TV, a smartphone device, a tablet, computer monitor, projector, hologram projector, or suitable device capable of streaming a media asset. User TV equipment device 801 may include set-top box 815 (e.g., media equipment device 524 in FIG. 5). Set-top box 815 may be communicatively connected to microphone 816, audio output equipment (e.g., speaker or headphones 814), display 812 (e.g., displays 104, 204A-C, 504, 604, 704 discussed in relation to FIGS. 1, 2A-3D, 5A-5C, 6, and 7), and sensor 813 (e.g., position sensor 106 in FIG. 1). In some embodiments, microphone 816 may receive audio corresponding to a voice of a user, e.g., a voice command. In some embodiments, display 812 may be a TV display or a computer display. In some embodiments, set-top box 815 may be communicatively connected to user input interface 810. In some embodiments, user input interface 810 may be a remote control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 9. In some embodiments, device 800 may comprise any suitable number of sensors, as well as a GPS module (e.g., in communication with one or more servers and/or cell towers and/or satellites) to ascertain a location of device 800.

Each one of user equipment device 800 and user equipment device 801 may receive content and data via input/output (I/O) path 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 8 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone, a tablet, a user-worn device (e.g., AR device 800), a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media system (e.g., the media system 102, 502, 702 in FIGS. 1, 5, and 7) stored in memory (e.g., storage 808). Specifically, control circuitry 804 may be instructed by the media system to perform the functions discussed above and below. In some implementations, processing or actions performed by control circuitry 804 may be based on instructions received from the media system.

In client/server-based embodiments, control circuitry 804 may include communications circuitry suitable for communicating with a server or other networks or servers. The media system may be a stand-alone application implemented on a device or a server. The media system may be implemented as software or a set of executable instructions. The instructions for performing any of the embodiments discussed herein of the media system may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, the media system may be a client/server application where only the client application resides on device 800, and a server application resides on an external server (e.g., server 904). For example, the media system may be implemented partially as a client application on control circuitry 804 of device 800 and partially on server 904 as a server application running on control circuitry 911. Server 904 may be a part of a local area network with one or more of devices 800 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 904), referred to as "the cloud." Device 800 may be a cloud client that relies on the cloud computing capabilities from server 904 to determine whether processing should be offloaded and facilitate such offloading. When executed by control circuitry 804 or 911, the media system may instruct control circuitry 804 or 911 to perform processing tasks for the client device and facilitate a media consumption session integrated with social network services. The client application may instruct control circuitry 804 to determine whether processing should be offloaded.

Control circuitry 804 may include communications circuitry suitable for communicating with a server, social network service, a table or database server, or other networks or servers The instructions for carrying out the above-mentioned functionality may be stored on a server (which is described in more detail in connection with FIG. 8). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media system data described above. Nonvolatile memory may also be used (e.g., to launch a boot-up routine and other instructions). Cloud-based storage may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment device 800, 801 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, eye tracking interface, or other user input interfaces. Display 812 may be provided as a stand-alone device or integrated with other elements of each one of user equipment device 800 and user equipment device 801. For example, the display 812 of the user equipment device 800 may be a display screen or combiner and the user input interface 810 may include an eye tracking interface that tracks the user's eye movements in relation to the display 812. The display 812 of the user equipment device 801 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Control circuitry 804 may receive information from the sensor 813 (or sensors). The information may include spatial data about nearby surroundings (e.g., viewing areas 100, 500, 600, 700 in FIGS. 1, 5, 6, and 7) and objects, including people. Sensor 813 may be any suitable sensor or sensors to detect a position and orientation of the surroundings. The sensor 813 may include transceivers, cameras, sonar, radar, lidar, lasers, global positioning system (GPS) beacons, inertial measurement systems (IMSs), accelerometers, and gyrometers. The sensor 813 may include emitters or projectors and receivers to detect reflections of an emitted source (e.g., electromagnetic waves and soundwaves), and the control circuitry 804 may use a delay between transmitting and receiving to determine positions and orientations of the surroundings. The sensor 813 may perform several measurements in multiple directions. In some embodiments, the control circuitry 804 may use the sensor 813 to scan the surroundings and capture images of one or more objects, which may be used to determine object locations within the environment. In some embodiments, the control circuitry 804 may generate a 3D map of the surroundings, specifying locations of objects and/or locations of users in the surroundings. In some embodiments, the sensor 813 may sense changes in its position over time, which the control circuitry 804 may use to track the position and orientation of an object coupled to the sensor 813. In some embodiments, a user may be requested by the control circuitry 804 to scan his or her surroundings.

Audio output equipment 814 may be integrated with or combined with display 812. Display 812 may be one or more of a monitor, a TV, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser TV, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and equipment 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card. Light 820 may be used to illuminate objects near the devices 800 and 801, and may include light emitting diode (LED) lights or other types of light producing devices. The light 820 may be used with the camera 818. Camera 822 may be an IR or ultraviolet (UV) camera. Light 824 may be an IR or UV emitter that emits light in the IR or UV wavelengths to reflect off nearby objects. The camera 822 detects the reflected wavelengths.

The media system may be implemented using any suitable architecture. For example, it may be a stand-alone application wholly-implemented on each one of user equipment device 800 and user equipment device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide media consumption and social network interaction functionality and generate any of the displays discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a media system and social network profile. Control circuitry 804 may obtain all or part of other user profiles that are related to a particular user (e.g., via social media networks), and/or obtain information about the user from other sources that control circuitry 804 may access. As a result, a user can be provided with a unified experience across the user's different devices.

In some embodiments, the media system is a client/server-based application. Data for use by a thick or thin client implemented on each one of user equipment device 800 and user equipment device 801 may be retrieved on-demand by issuing requests to a server remote to each one of user equipment device 800 and user equipment device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display may then be transmitted to device 800 for presentation to the user.

In some embodiments, the I/O path 802 may generate the output to the display 812. In some embodiments, the I/O path 802 may include the video generating circuitry. In some embodiments, the I/O path 802 and the control circuitry 804 may both generate the output to the display 812.

In some embodiments, the media system may be downloaded and interpreted or otherwise run by an interpreter or virtual machine (run by control circuitry 804). In some embodiments, the media system may be encoded in the ETV Binary Interchange Format (EBIF), received by control circuitry 804 as part of a suitable feed, and interpreted by a user agent running on control circuitry 804. For example, the media system may be an EBIF application. In some embodiments, the media system may be defined by a series of JAVA-based files that are received and run by a local virtual machine or other suitable middleware executed by control circuitry 804. In some of such embodiments (e.g., those employing MPEG-2 or other digital media encoding schemes), the media system may be, for example, encoded and transmitted in an MPEG-2 object carousel with the MPEG audio and video packets of a program.

FIG. 9 shows illustrative systems, in accordance with some embodiments of this disclosure.

User equipment devices 907, 908, 909, 910 (e.g., user devices 104, 108, 204A-C, 504, 508, 604, 608, 704, 708, 800 in FIGS. 1-3D and 5A-8) and/or other connected devices (e.g., position sensors 106, 813 in FIGS. 1 and 8)) or suitable devices, or any combination thereof, may be coupled to communication network 906. In the depicted embodiment, the user equipment device 907 is a personal computer, user equipment device 908 is an AR headset, user equipment device 909 is a smartphone, and user equipment device 910 is a TV. Communication network 906 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 906) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth®, infrared, IEEE 702-11x, etc.), or other short-range communication via wired or wireless paths. The user equipment devices may also communicate with each other directly through an indirect path via communication network 906.

System 900 may comprise media content source 902 (e.g., media asset 116, 716 in FIGS. 1 and 7), one or more servers 904, and one or more social network services. In some embodiments, the media system may be executed at one or more of control circuitry 911 of server 904 (and/or control circuitry of user equipment devices 907, 908, 909, 910. In some embodiments, spatial data about viewing areas (e.g., viewing areas 100, 500, 600, 700 in FIGS. 1, 5, 6, and 7) or objects in the viewing area (e.g., furniture 114, 714 in FIGS. 1 and 7 and users 112, 212A-C, 512, 612, 712 in FIGS. 1-2C, 5A-7), user name and preferences, information about the media content source 902 (e.g., present time point and time remaining), or any other suitable data structure or any combination thereof, may be stored at database 905 maintained at or otherwise associated with server 904, and/or at storage of one or more of user equipment devices 907, 908, 909, 910.

In some embodiments, server 904 may include control circuitry 911 and storage 914 (e.g., RAM, ROM, Hard Disk, Removable Disk, etc.). Storage 914 may store one or more databases 905. Server 904 may also include an input/output path 912. I/O path 912 may provide media consumption data, social networking data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912. I/O path 912 may connect control circuitry 911 (and specifically control circuitry 804) to one or more communications paths. I/O path 912 may comprise I/O circuitry.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

FIG. 10 depicts an illustrative flow diagram for a process 1000 for providing supplemental AR content (e.g., AR content 730, 732, 734 in FIG. 7), in accordance with some embodiments of this disclosure. The processes shown in FIG. 10 may be implemented, in whole or in part, by one or more systems or devices described herein.

The process 1000 starts at operation 1002 with starting, e.g., using control circuitry (control circuitry 804, 911 in FIGS. 8 and 9), a shared media session, such as described above with respect to FIG. 1 and operations 402 through 416 in FIG. 4. The shared media session may be hosted on the server 904 described in relation to FIG. 9. The process 1000 continues to operation 1004 with users streaming, e.g., using the control circuitry, a media asset (e.g., media asset 116 and 716, and media content source 902 in FIGS. 1, 7, and 9) on displays of the users (e.g., displays 104, 204A-C, 504, 604, 704, 812, 907-910 in FIGS. 1, 2A-3D, 5A-5C, 6, 7, 8, and 9), such as described above with respect to FIGS. 1, 3D, operation 418 in FIG. 4, and FIGS. 8, and 9. The process 1000 continues to operation 1006 with receiving a request, e.g., using I/O circuitry (I/O path 802, 914 in FIGS. 8 and 9), from a first user to create virtual content (e.g., supplemental AR content), such as described above with respect to FIG. 7. The user device 801 in FIG. 8 or the server 904 in FIG. 9 may receive the request from the users. User requests may be inputted through user devices 800 or 801 in FIG. 8 or user equipment devices 907, 908, 909, 910 in FIG. 9. The process 1000 continues to operation 1008 with generating, e.g., using the I/O circuitry, the virtual content, such as described above with respect to FIG. 7. The user device 801 in FIG. 8 or the server 904 in FIG. 9 may generate the virtual content. In some embodiments, the user device 800 in FIG. 8 or user equipment devices 907, 908, 909, 910 in FIG. 9 generate the virtual content. In some embodiments, the control circuitry may generate the virtual content. The process 1000 continues to operation 1010 with displaying, e.g., using the I/O circuitry, the virtual content on an AR headset (e.g., AR headsets 108, 508, 608, 708, 800, 908 in FIGS. 1 and 5A-9) of a second user, such as described above with respect to FIG. 7. The process 1000 continues to operation 1012 with receiving, e.g., using the I/O circuitry, a request from the second user to modify the virtual content, such as described above with respect to FIG. 7. The process 1000 continues to operation 1014 with regenerating and displaying, e.g., using the I/O circuitry, the virtual content based on modifications performed by the second user, such as described above with respect to FIG. 7. The process 1000 concludes at operation 1016 with ending streaming of the media asset, e.g., using the control circuitry, and ending the shared media session, such as described above with respect to operation 422 in FIG. 4. In some embodiments, the I/O circuitry may be used to stream the media asset.

Figure 11A:
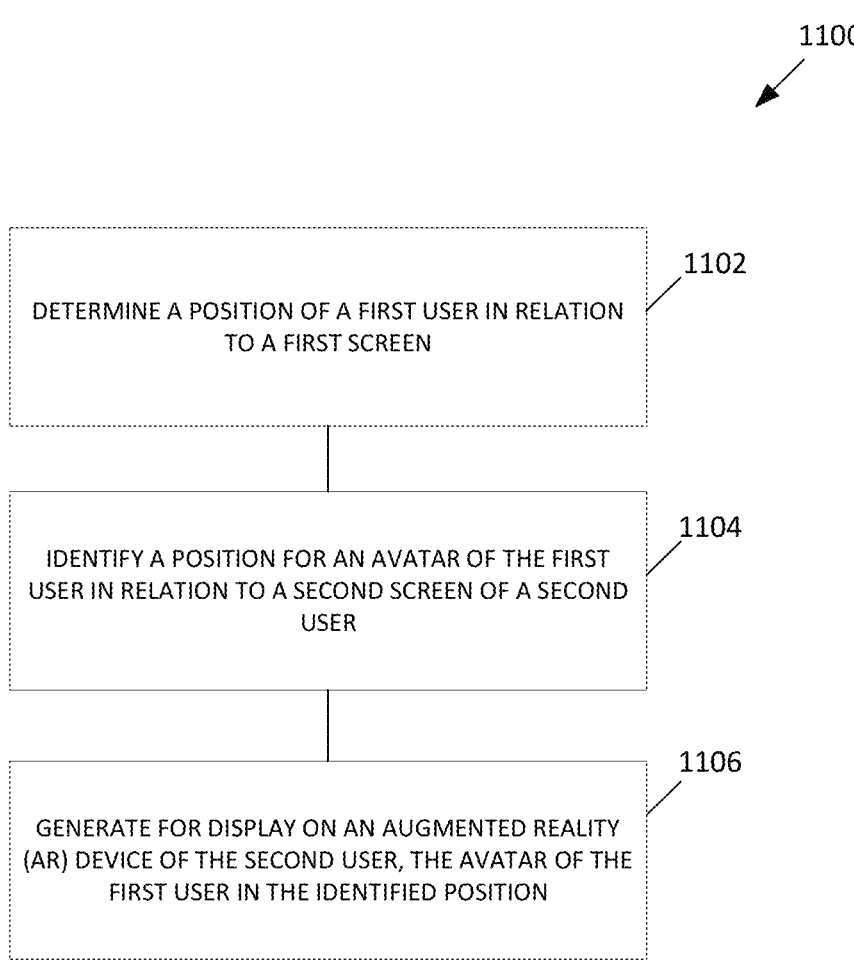
FIGS. 11A and 11B are flowcharts of processes for creating a social content-viewing experience, in accordance with some embodiments of this disclosure.
Figure 11B:
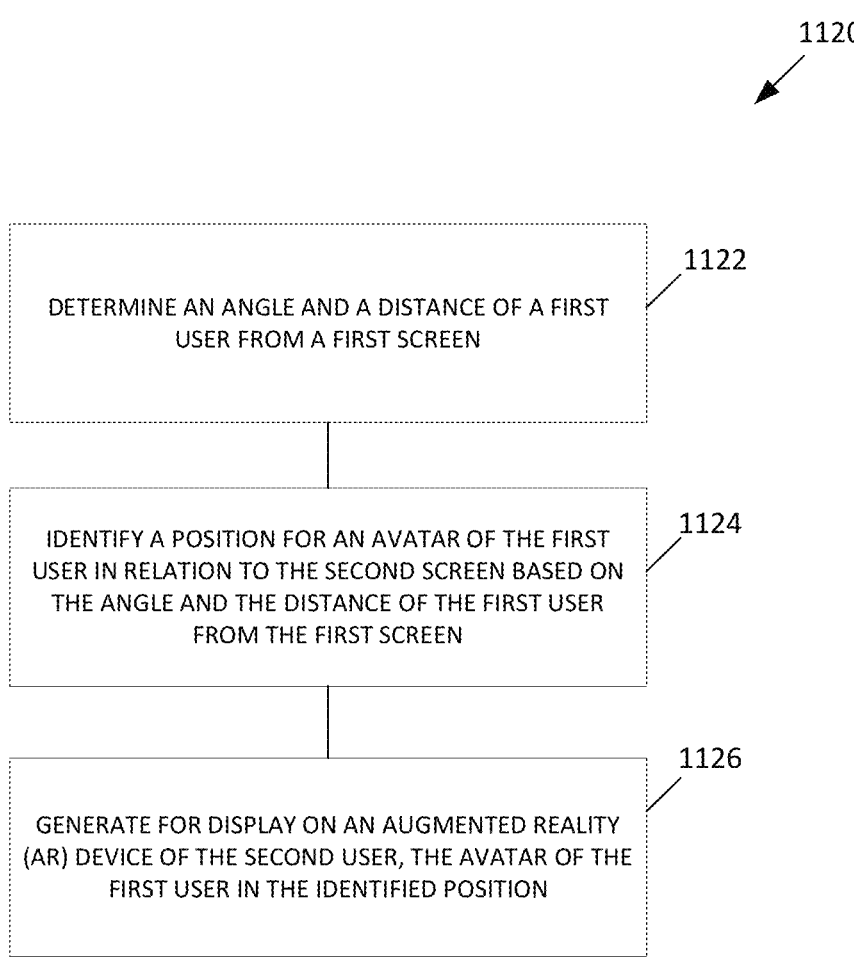

FIGS. 11A and 11B are flowcharts of processes 1100 and 1120 for creating a social content-viewing experience, in accordance with some embodiments of this disclosure. The processes shown in FIGS. 11A and 11B may be implemented, in whole or in part, by one or more systems or devices described herein.

Referring to FIG. 11A, the process 1100 starts at operation 1102 with determining, e.g., using control circuitry (e.g., control circuitry 804, 911 in FIGS. 8 and 9), a position of a first user (e.g., users 212A-C in FIGS. 2A-2C) in relation to a first screen (e.g., displays 204A-C in FIGS. 2A-2C), such as described above with respect to FIG. 1-5A. The process 1100 continues to operation 1104 with identifying, e.g., using the control circuitry, a position for an avatar (e.g., avatars 110A-C, 510A-B, 610A-B, 710A-B in FIGS. 1, 5A-5C, 6, and 7) of the first user in relation to a second screen (e.g., displays 104, 204A-C, 504, 604, 704 in FIGS. 1, 2A-3D, 5A-5C, 6, and 7) of a second user (e.g., users 112, 212A-C, 512, 612, 712 in FIGS. 1, 2A-3D, 5A-5C, 6, and 7), such as described above with respect to FIGS. 1 and 4-7. In some embodiments, the user device 801 in FIG. 8 or the server 904 in FIG. 9 may determine the positions of the users and/or identify positions for the avatars. In some embodiments, the user device 800 in FIG. 8 or user equipment devices 907, 908, 909, 910 in FIG. 9 determines and/or identifies the positions. The process 1100 continues to operation 1106 with generating for display at an augmented reality (AR) device of the second user, e.g., using I/O circuitry (I/O path 802, 914 in FIGS. 8 and 9), the avatar of the first user in the identified position, such as described above with respect to FIGS. 1 and 3A-7. In some embodiments, the user device 800 in FIG. 8 or user equipment devices 907, 908, 909, 910 in FIG. 9 generate the avatars. In some embodiments, the control circuitry may generate for display the avatar of the first user. In some embodiments, the user device 801 in FIG. 8 or the server 904 in FIG. 9 may generate the avatars.

Referring to FIG. 11B, the process 1120 starts at operation 1122 with determining, e.g., using the control circuitry, an angle and a distance of a first user from a first screen, such as described above with respect to FIG. 1-5A. The process 1120 continues to operation 1124 with identifying, e.g., using the control circuitry, a position for an avatar of the first user in relation to the second screen of the second user, such as described above with respect to FIGS. 1 and 4-7. The process 1120 continues to operation 1126 with generating for display at an AR device of the first user, e.g., using the I/O circuitry, the avatar of the first user in the identified position, such as described above with respect to FIGS. 1 and 3A-7.

Although FIGS. 11A and 11B show example operations of processes 1100 and 1120, in some implementations, the process 1100 and 1120 may include additional operations, fewer operations, different operations, or differently arranged operations than those depicted in FIGS. 11A and 11B. Additionally, or alternatively, two or more of the operations of processes 1100 and 1120 may be performed in parallel.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining a position of a first user in relation to a first physical screen of the first user on which the first user is viewing a media asset, wherein the first physical screen is located in a first physical space;
   identifying a position for an avatar of the first user in relation to a second physical screen of a second user on which the second user is viewing the media asset, wherein:
   the second physical screen is located in a second physical space; and
   the position for the avatar of the first user in relation to the second physical screen is calculated based on the position of the first user in relation to the first physical screen; and
   generating for display, on an augmented reality (AR) device of the second user, the avatar of the first user in the identified position.

2. The method of claim 1, wherein:
   determining the position of the first user in relation to the first physical screen comprises determining an angle and a distance of the first user from the first physical screen;
   the position of the avatar of the first user in relation to the second physical screen comprises an angle and a distance of the avatar from the second physical screen; and
   the angle and the distance of the avatar from the second physical screen is the same angle and distance as the first user from the first physical screen.

3. The method of claim 2, wherein:
   the angle and the distance of the first user from the first physical screen is calculated from a center point of the first physical screen;
   the distance of the avatar from the second physical screen is taken from a center point of the second physical screen; and
   the angle of the avatar from the second physical screen is taken from the front of the second physical screen.

4. The method of claim 1, wherein:
   determining the position of the first user in relation to the first physical screen comprises determining an angle and a distance of the first user from the first physical screen;
   the position of the avatar of the first user in relation to the second physical screen comprises an angle and a distance of the avatar from the second physical screen; and
   identifying the position for the avatar of the first user in relation to the second physical screen comprises:
   determining the position for the avatar of the first user in relation to the second physical screen partially overlays a position of the second user in relation to the second physical screen; and in response to determining the position for the avatar of the first user in relation to the second physical screen partially overlays the position of the second user in relation to the second physical screen, modifying at least one of the angle and the distance of the avatar from the second physical screen from the determined angle and the distance of the first user from the first physical screen.

5. The method of claim 1, further comprising displaying a same media asset on the first physical screen and the second physical screen.

6. The method of claim 5, wherein changing playback of the media asset on the first physical screen changes playback of the media asset on the second physical screen.

7. The method of claim 5, further comprising:

receiving annotations of the media asset displayed on the first physical screen; and generating for display on the AR device of the second user, annotations of the media asset displayed on the second physical screen based on the received annotations.

8. The method of claim 5, further comprising generating for display on the AR device of the second user, supplemental AR content based on the media asset displayed on the second physical screen.

9. The method of claim 1, further comprising generating for display on the AR device of the second user, an item of furniture for the avatar of the first user.

10. The method of claim 1, wherein:

determining the position of the first user in relation to the first physical screen comprises determining an angle and a distance of the first user from the first physical screen; and identifying the position for the avatar of the first user in relation to the second physical screen of the second user comprises:

determining the position of the avatar of the first user in relation to the second physical screen is outside of a viewing area of the second user; and in response to determining the position of the avatar of the first user in relation to the second physical screen is outside of the viewing area of the second user, modifying the distance of the avatar of the first user in relation to the first physical screen to be within the viewing area of the second user.

11. The method of claim 1, wherein the position of the first user in relation to the first physical screen is determined using an AR device of the first user.

12. The method of claim 1, wherein determining the position of the first user in relation to the first physical screen comprises determining a first position at a first time and a second position at a second time, the second position different than the first position.

13. The method of claim 1, further comprising:

determining a position of the second user in relation to the second physical screen;

identifying a position for an avatar of the second user in relation to the first physical screen of the first user, wherein the position for the avatar of the second user in relation to the first physical screen is calculated based on the position of the second user in relation to the second physical screen; and generating for display on an AR device of the first user, the avatar of the second user in the identified position for the avatar of the second user.

14. A system comprising:

a sensor;

control circuitry configured to:

determine, using the sensor, a position of a first user in relation to a first physical screen of the first user on which the first user is viewing a media asset, wherein the first physical screen is located in a first physical space;

identify a position for an avatar of the first user in relation to a second physical screen of a second user on which the second user is viewing the media asset, wherein:

the second physical screen is located in a second physical space; and the position for the avatar of the first user in relation to the second physical screen is calculated based on the position of the first user in relation to the first physical screen; and input/output (I/O) circuitry configured to:

generate for display, on an augmented reality (AR) device of the second user, the avatar of the first user in the identified position.

15. The system of claim 14, wherein:

the control circuitry is configured to determine the position of the first user in relation to the first physical screen by determining an angle and a distance of the first user from the first physical screen;

the position of the avatar of the first user in relation to the second physical screen comprises an angle and a distance of the avatar from the second physical screen; and the angle and the distance of the avatar from the second physical screen is the same angle and distance as the first user from the first physical screen.

16. The system of claim 14, wherein:

the control circuitry is configured to identify the position for the avatar of the first user in relation to the second physical screen by:

determining the position for the avatar of the first user in relation to the second physical screen partially overlays a position of the second user in relation to the second physical screen; and the I/O circuitry is configured to, in response to determining the position for the avatar of the first user in relation to the second physical screen partially overlays the position of the second user in relation to the second physical screen, prompt the second user to adjust their position in relation to the second physical screen.

17. The system of claim 14, wherein the I/O circuitry is configured to display a same media asset on the first physical screen and the second physical screen.

18. The system of claim 17, wherein:

the I/O circuitry is configured to receive annotations of the media asset displayed on the first physical screen; and the I/O circuitry is configured to generate for display on the AR device of the second user, annotations of the media asset displayed on the second physical screen based on the received annotations.

19. The system of claim 17, wherein the I/O circuitry is configured to generate for display on the AR device of the second user, supplemental AR content based on the media asset displayed on the second physical screen.

20. The system of claim 14, wherein an AR device of the first user comprises the control circuitry configured to determine the position of the first user in relation to the first physical screen.

* * * * *